United States Patent [19]

Wilber et al.

[11] 3,921,141

[45] Nov. 18, 1975

[54] MALFUNCTION MONITOR CONTROL CIRCUITRY FOR CENTRAL DATA PROCESSOR OF DIGITAL COMMUNICATION SYSTEM

[75] Inventors: John A. Wilber, Elk Grove Village; Rolfe E. Buhrke, La Grange Park; Verner K. Rice, Wheaton, all of Ill.

[73] Assignee: GTE Automatic Electric Laboratories Incorporated, Northlake, Ill.

[22] Filed: Sept. 14, 1973

[21] Appl. No.: 397,567

[52] U.S. Cl. . 340/172.5; 235/153 AE; 235/153 AK

[51] Int. Cl.$^2$ .................... G06F 11/00; G06F 11/06

[58] Field of Search ................ 340/172.5, 146.1 BE; 235/153 AC, 153 AE, 153 AK

[56] References Cited

UNITED STATES PATENTS

| | | | |
|---|---|---|---|
| 3,252,149 | 5/1966 | Weida | 340/172.5 |
| 3,377,623 | 4/1968 | Reut | 340/172.5 |
| 3,409,877 | 11/1968 | Alterman | 340/172.5 |
| 3,409,879 | 11/1968 | Keister | 340/172.5 |
| 3,444,528 | 5/1969 | Lowell | 340/172.5 |
| 3,471,686 | 10/1969 | Connell | 235/153 |
| 3,517,174 | 6/1970 | Ossfeldt | 235/153 |
| 3,562,716 | 2/1971 | Fontaine | 340/172.5 |
| 3,624,372 | 11/1971 | Philip | 235/153 |
| 3,654,603 | 4/1972 | Gunning | 340/146.1 |
| 3,678,467 | 7/1972 | Nussbaum | 340/172.5 |

*Primary Examiner*—Gareth D. Shaw
*Assistant Examiner*—James D. Thomas
*Attorney, Agent, or Firm*—John T. Winburn

[57] ABSTRACT

Circuitry is disclosed for detecting malfunctions in a communication system having duplicate central data processors, only one of which may be active at any given time. The circuitry detects malfunctions during the execution of operational programs and classifies the malfunctions as to whether they are caused in the Central Processor, Instruction Storage, Process Storage, or Peripheral Units. The circuitry includes a Match Network for matching signals between duplicate copies of the central processor; a Parity Network for checking parity; and circuitry for analyzing the malfunctions to determine the subsystem within each major unit which may have caused the malfunction.

7 Claims, 19 Drawing Figures

MMC FUNCTIONAL BLOCK DIAGRAM

CENTRAL PROCESSOR FUNCTIONAL INTERFACE BLOCK DIAGRAM

MALFUNCTION MONITOR CIRCUIT (MMC)

MMC FUNCTIONAL BLOCK DIAGRAM

MATCH NETWORK (MAN)

| CIRCUIT | POINT | MNEMONIC | DESCRIPTION (FOR FF SET) |
|---|---|---|---|
| TLGC | 00 | SBYSF | STANDBY CP STOPPED |
| MAN IN MCC | 01 | MAENF1 | MATCHING ENABLED |
| | 02 | SMENF | SAMPLE MATCH ENABLED |
| | 03 | | |
| | 04 | | |
| | 05 | | |
| | 06 | | |
| | 07 | | |
| | 08 | | |
| ERROR FF'S IN MMC | 09 | T1MEF | CP MATCH ERROR IN INTERVAL 1 |
| | 10 | T2MEF | CP MATCH ERROR IN INTERVAL 2 |
| | 11 | T3MEF | CP MATCH ERROR IN INTERVAL 3 |
| | 12 | T4MEF | CP MATCH ERROR IN INTERVAL 4 |
| | 13 | T5MEF | CP MATCH ERROR IN INTERVAL 5 |
| | 14 | T6MEF | CP MATCH ERROR IN INTERVAL 6 |
| | 15 | T7MEF | CP MATCH ERROR IN INTERVAL 7 |
| | 16 | ISMEF | IS MATCH ERROR IN INTERVAL Ø |
| | 17 | PSMEF | PS MATCH ERROR IN INTERVAL 7 (PS INST.) |
| | 18 | PUME1F | PU MATCH ERROR IN INTERVAL 7 (PU CYCLE 1) |
| | 19 | PUME2F | PU MATCH ERROR IN INTERVAL 5 (PU CYCLE 2) |
| | 20 | ISDWF | IS DATA ASW ERROR |
| | 21 | ISDPF | IS DATA PARITY ERROR |
| | 22 | ISAMF | IS ADDRESS MATCH ERROR |
| | 23 | ISIWF | IS INSTRUCTION ASW ERROR |
| | 24 | ISIPF | IS INSTRUCTION PARITY ERROR |
| | 25 | ISAPF | IS ADDRESS PARITY ERROR |
| | 26 | PSDWF | PS DATA ASW ERROR |
| | 27 | PSDPF | PS DATA PARITY ERROR |
| | 28 | PSAMF | PS ADDRESS MATCH ERROR |
| | 29 | PUDWF | PU DATA ASW ERROR |
| | 30 | PUAWF | PU ADDRESS ASW ERROR |
| | 31 | PUAMF | PU ADDRESS MATCH ERROR |

FIG. 17

| CURCUIT | POINT | MNEMONIC | DESCRIPTION |
|---|---|---|---|
| TLGC | 00 | SBYSFS | STOP STANDBY CP |
| | 01 | SBYSFR | START STANDBY CP |
| MAN IN MMC | 02 | MODER | RESET FF'S SET BY PT'S MARKED* |
| | 03* | MAENFØS | ENABLE CONTINUOUS MATCH |
| | 04* | SMENFS | ENABLE SAMPLE MATCH |
| | 05* | MRUFS | UNLOCK MATCH REGISTERS |
| | 06* | MIRUFS | UNLOCK MATCH IMAGE REGISTERS |
| | 07* | DMMFS | DETECT MISMATCHES |
| | 08* | TØMSFS | MATCH INTERVAL Ø |
| | 09* | T1MSFS | MATCH INTERVAL 1 |
| | 10* | T2MSFS | MATCH INTERVAL 2 |
| | 11* | T3MSFS | MATCH INTERVAL 3 |
| | 12* | T4MSFS | MATCH INTERVAL 4 |
| | 13* | T5MSFS | MATCH INTERVAL 5 |
| | 14* | T6MSFS | MATCH INTERVAL 6 |
| | 15* | T7MSFS | MATCH INTERVAL 7 |
| | 16 | MRØR | RESET MRØ. BØØ - B31 |
| | 17 | MIRØR | RESET MIRØ.BØØ- B31 |
| | 18 | MR1R | RESET MR1. BØØ - B31 |
| | 19 | MIR1R | RESET MIR1.BØØ - B31 |
| MFAC IN MMC | 20 | ERFR | RESET ALL MFAC ERROR EF'S |
| | 21 | AMFS | SET ISAMF, PSAMF, PUAMF |
| | 22 | INEXFR | RESET PUFØ, PUF 1, PSF, PSAEF, RPSF ** |
| | 23* | MEIEFS | SET MEIEF-MATCH ERROR INTERRUPT ENABLE |
| | 24 | SXECFS | SET SBY EXECUTE FF SXECF |
| | 25 | SXECFR | RESET SBY EXECUTE FF SXECF |
| MAN IN | 26* | CYC2FS | SAMPLE MATCH IN CYCLE 2 |
| | 27* | SMABØS | SAMPLE MATCH ADDRESS REGISTER (BØØ) |
| | 28* | SMAB1S | SAMPLE MATCH ADDRESS REGISTER (BØ1) |
| | 29* | SMAB2S | SAMPLE MATCH ADDRESS REGISTER (BØ2) |
| | 30* | SMAB3S | SAMPLE MATCH ADDRESS REGISTER (BØ3) |
| | 31* | SMAB4S | SAMPLE MATCH ADDRESS REGISTER (BØ4) |

** ALSO RESETS DCCAF, DCCBF, MCF, AND RPF IN PCC

FIG. 18

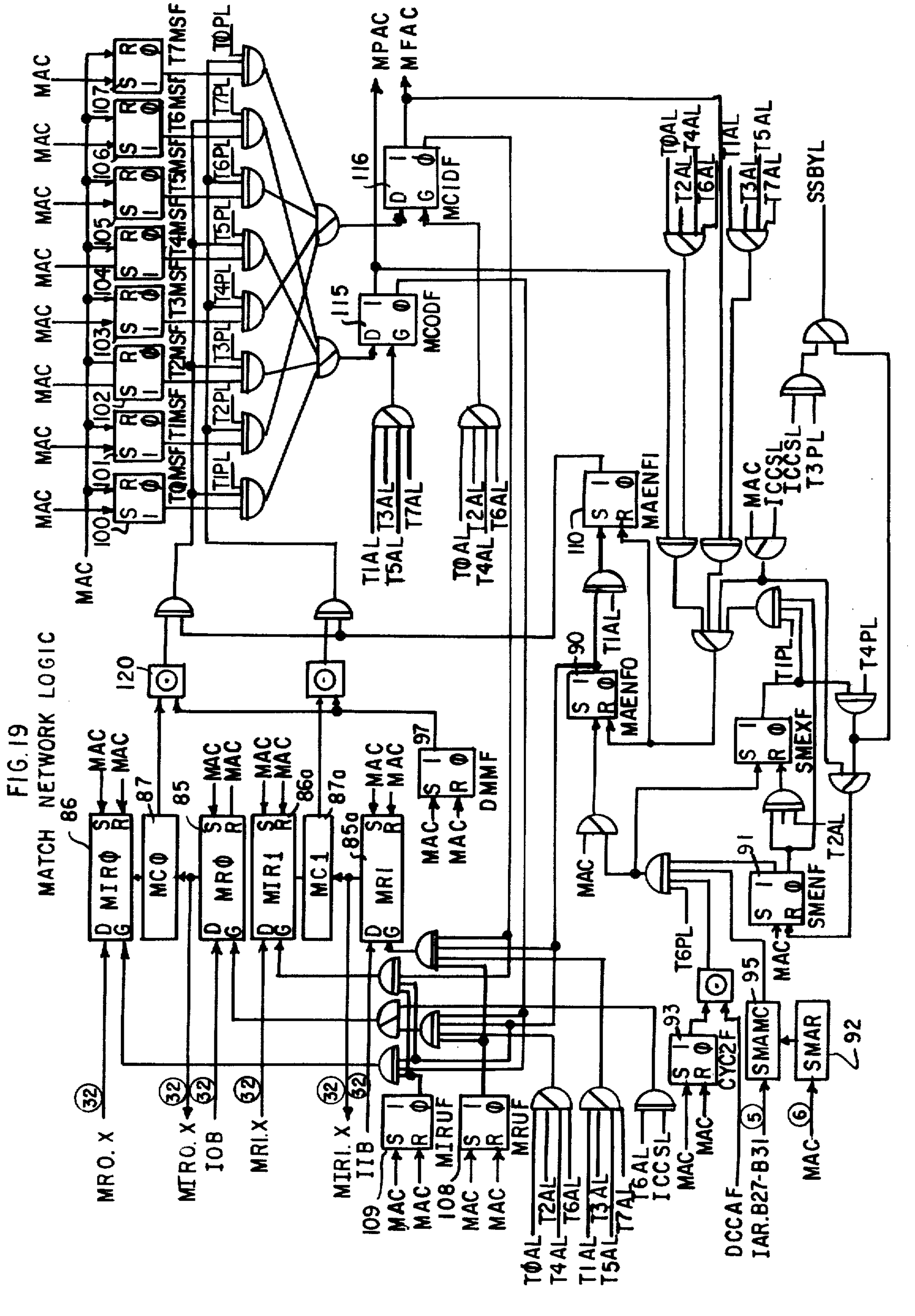
FIG. 19 MATCH NETWORK LOGIC

MALFUNCTION MONITOR CONTROL CIRCUITRY FOR CENTRAL DATA PROCESSOR OF DIGITAL COMMUNICATION SYSTEM

TABLE OF CONTENTS

Abstract
Background and Summary
Drawings
Detailed Description
I. Introduction--TSPS
II. The Central Process--An Overview
IIA. Processing Circuits of Central Processor
Timing Generator Circuit (TGC)
Processor Control Circuit (PCC)
Data Processing Circuit (DPC)
Input Output Circuit (IOC)
IIB. Maintenance Circuits
Malfunction Monitor Circuit (MMC)
Timing Monitor Circuit (TMC)
Interrupt Control Circuit (ICC)
Recovery Control Circuit (RCC)
Configuration Control Circuit (CCC)
Maintenance Access Circuit (MAC)
Power Monitor Circuit (PMC)
III. Malfunction Monitor Circuit
Overview
Match Network (MAN)
Functions of Matched Systems - During Matching
When Matching is Inhibited
Matching Options — MAN Control FF's
Options for Matching Mode
Options for Selection of
Abnormal Matched Conditions
Options to Enable Timing Intervals
Unlocking of Match Registers
Normal Status of MAN
Contents of Matched Registers After Interrupts
MAN Control Logic
Matched Register Controls Accept Levels
Other Controls for Matched Registers
Generation of Outputs to MFAC
Control of Matched Modes
Match Enable FF's
Flip-flops Associated With
Sample Matched Mode
Generation of Stop Standby Level
Parity Network (PAN)
a. ISR Security Circuit (ISRPC) 125
b. Instruction Store Address Parity Circuit (ISAPC) 126
c. Instruction Store T-Field Parity Circuit (ISTPC) 128
d. PSR Parity Circuit 130
e. DR Parity Circuit (DPRC) 132
Malfunction Analysis Circuit MFAC
Error Flip-flops in MFAC
Central Processor Error Flip-flops
Stored Error Flip-flops
Process Store Error Flip-flops
Peripheral Unit Error Flip-flops
MMC Instruction-Extension FF's
Error Level Generation
Inputs from ICC
Inputs from IOC
Inputs from MAC
Inputs from the MMC of the Other (External) CP
Inputs from PCC
Inputs from TGC
MMC Outputs
Matched Network Output
Outputs to Other Circuits Within MMC
Outputs from Parity Networks (PAN) Outputs
Outputs of PAN to Circuits Within MMC
Malfunction Analysis Circuits (MFAC) Outputs
Design Equations for MFAC
Control of Instruction Extension FF's
Control of Error Flip-flops
CP Error FF's
IS Error FF's
PS Error FF's
PU Error FF's
Error Level Generation
Internal Error Levels
External Level Errors (2 MMC and External CP)
Error Levels (21CC in Home CP)

BACKGROUND AND SUMMARY

The present invention relates to communication systems, and more particularly, it relates to communication systems which employ digital control systems including central data processors.

One such data processor is disclosed in the co-owned U.S. Pat. of Brenski, et al, entitled "Control Complex for TSPS Telephone System," U.S. Pat. No. 3,818,455. The subject matter of said appliction is incorporated herein by reference. Further, the subject matters of the following applications relate to and further describe the Central processor, Instruction Store, Process Store, and Peripheral Unit; and they further relate to the instant invention and are incorporated herein by reference:

1. Chang, et al, "Timing Generator Circuit for Central Data Processor of Digital Communications System," U.S. Pat. No. 3,810,121;

2. Schulte, et al, "Maintenance Access Circuit for Central Processor of Digital Communication System," U.S. Pat. No. 3,806,887;

3. Wilber, et al, "System for Reconfiguring Central Processor and Instruction Storage Combinations," Ser. No. 341,428, filed Mar. 15, 1973;

4. Buhrke, et al, "Timing Monitor Circuit for Central Data Processor of Digital Communication System," Ser. No. 393,543, filed Aug. 31, 1973;

5. Schulte, et al, "Program Timing Circuitry for Central Data Processor of Digital Communication System," Ser. No. 393,542, filed Aug. 31, 1973; and

6. Mele, et al, "Configuration Control Circuit for Control and Maintenance Complex of Digital Communication System," Ser. No. 397,452, filed Sept. 14, 1973; and

7. Mele, et al, "Interrupt Control Circuit for Central Data Processor of Digital Communication System," Ser. No. 397,458, filed Sept. 14, 1973.

In brief, the circuitry of the present invention detects and isolates malfunctions or faults in a Control and Maintenance Complex of a Communication System. The Control and Maintenance Complex (CMC) includes duplicate copies of Central Processors, duplicate copies of Instruction Storage, duplicate copies of Process Storage, and duplicate copies of Peripheral Controllers.

Only one of the central processors is active at any given time, and the other is standby.

Duplicate central processors are provided for reliability—that is, in the event that one processor is not operating properly, and an error is detected, the other central processor will be switched to the active state so that the first central processor may be diagnosed.

The principal method by which errors are detected in the central processor is by matching the contents of corresponding circuits in the two processors when they are operating in synchronism. In addition, with respect to the storage units and peripheral units, which receive and transmit data, parity checks are made.

The Malfunction Monitor Circuit (MMC) checks Central Processor operations with malfunction detection circuits that use logical redundancy as the basis for detection. That is, these circuits match the contents of identical units within each Central Processor.

Hence, the MMC detects malfunctions during the execution of operational programs, and classifies these malfunctions as to whether they are caused in the CP, IS, PS or PU. An indication of a malfunction is transmitted to the Interrupt Control Circuit in each CP; and the malfunction is indicated on error flip-flops associated with each major subsystem.

In addition, the address of the instruction being executed is stored in the Malfunction Monitor Circuitry when a maintenance interrupt occurs, and special facilities are provided for use by recovery programs. Recovery programs, when used, attempt to reconstruct an operational system.

The Malfunction Monitor Circuit compares all data transferred on the internal CP buses, comparing the data of one CP with that of the other; and it checks parity of data received from the storage units by the CP in which the associated malfunction monitor circuitry resides.

In addition, the Malfunction Monitor Circuitry receives various externally developed signals for checking an error-detection purpose.

The Malfunction Monitor Circuit includes a Match Network (MAN), a Parity Network (PAN), and a Malfunction Analysis Circuit (MFAC). The MAN contains the circuitry which checks the inter-CP matching and data-transfer facilities.

The PAN contains various parity circuits for checking parity of data returned from Instruction Store and Process Store.

The MFAC is responsive to malfunction indicators from MAN and PAN and the external signal indicators from the Central Processor for analyzing and isolating the various malfunctions detected.

THE DRAWING

Figure 3:
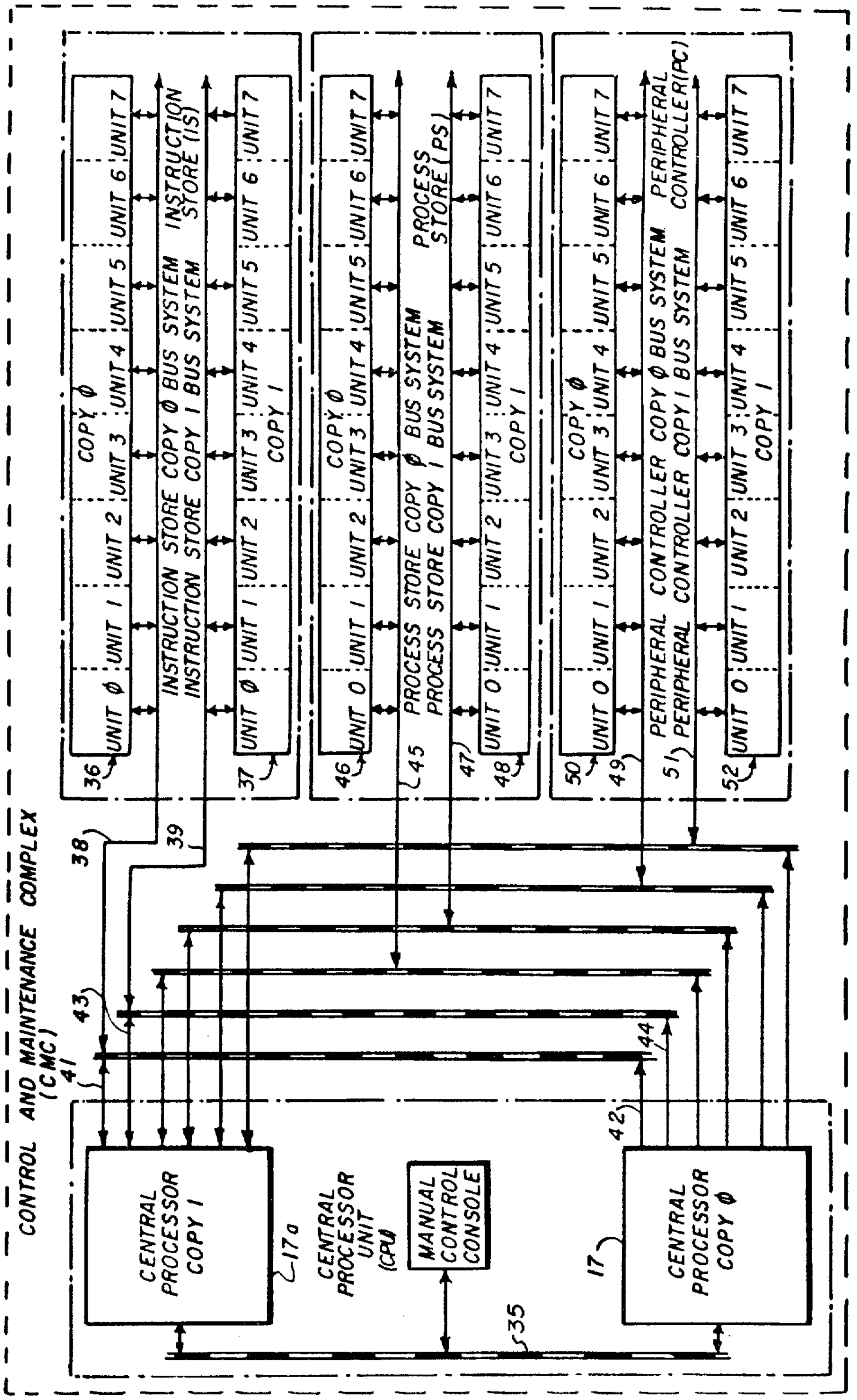
Figure 4:
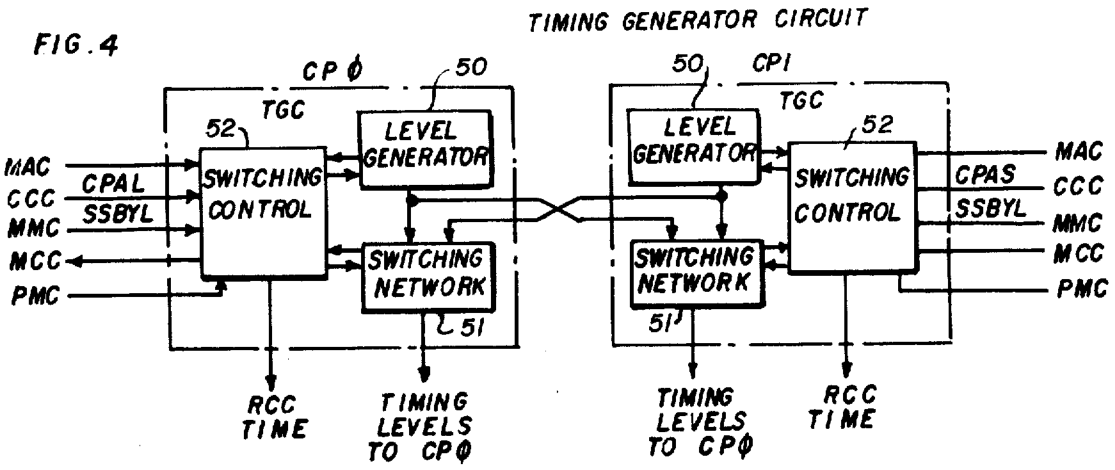
Figure 5:
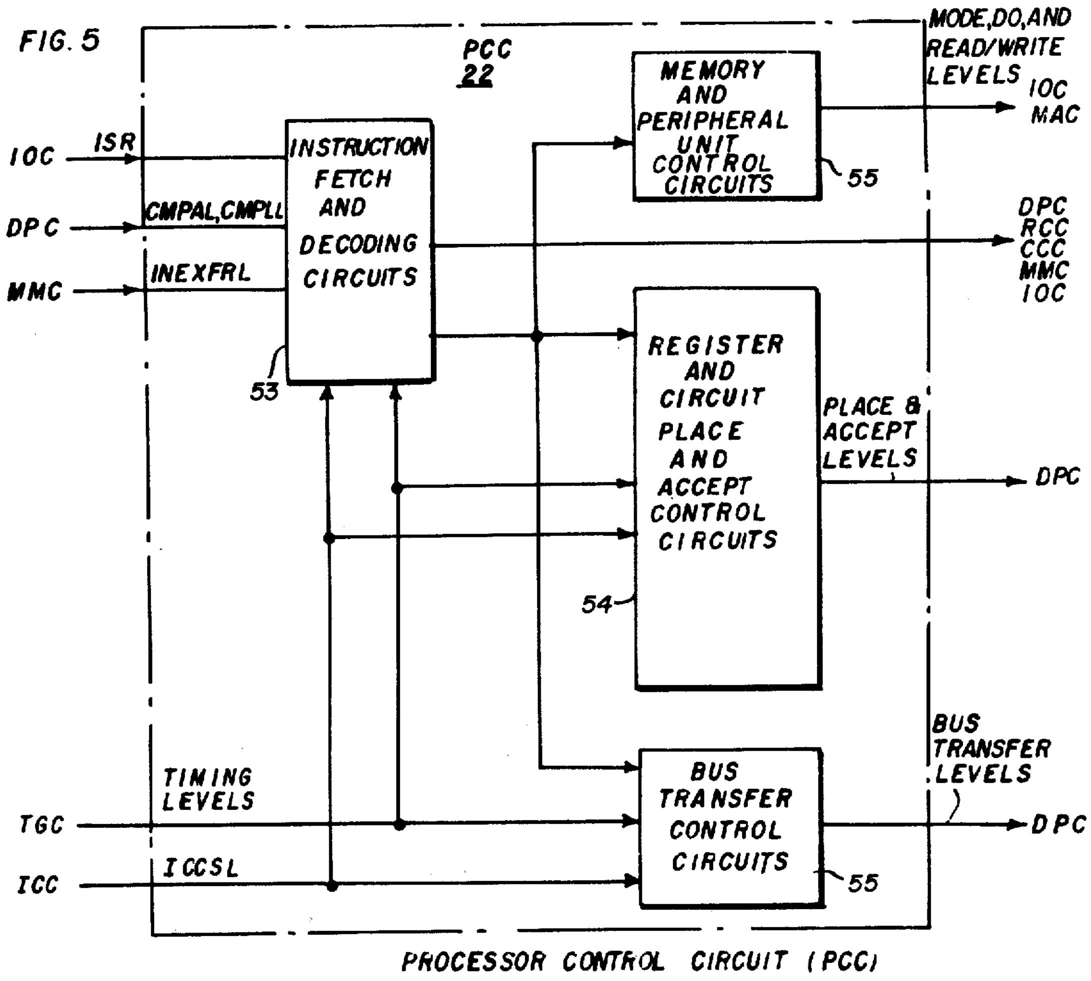
Figure 6:
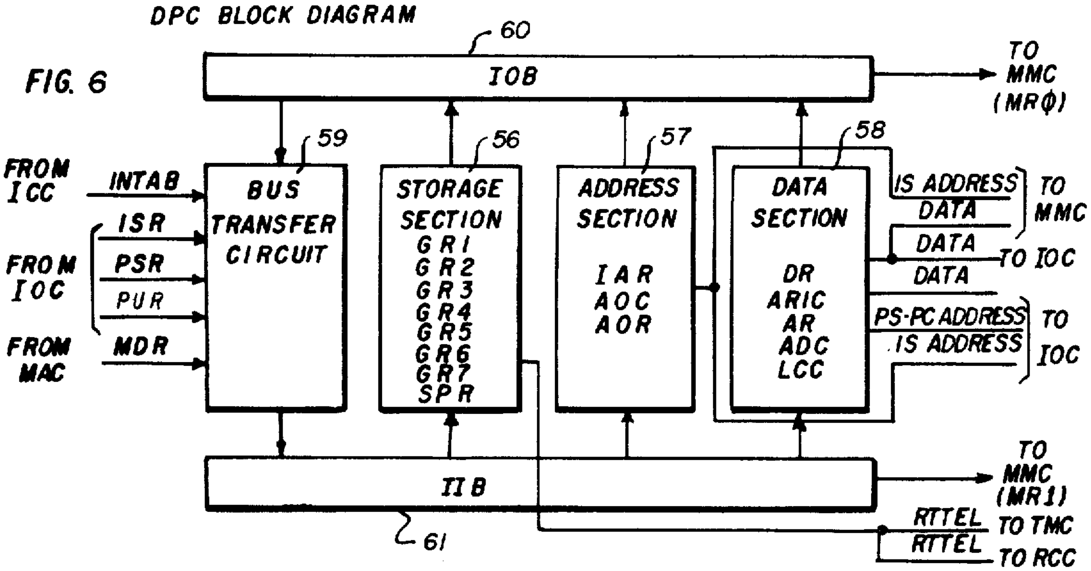
Figure 7:
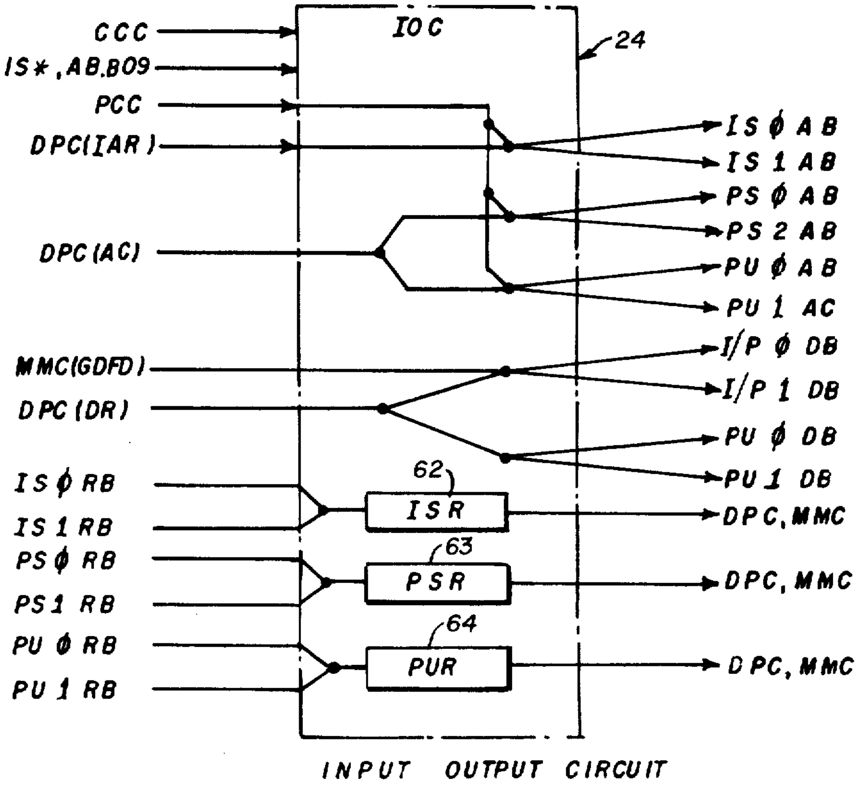
Figure 8:
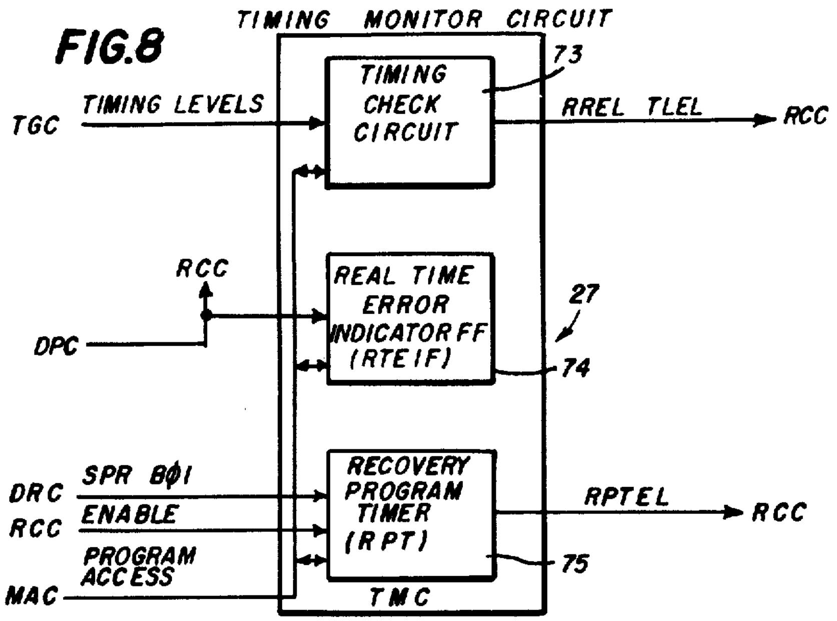
Figure 9:
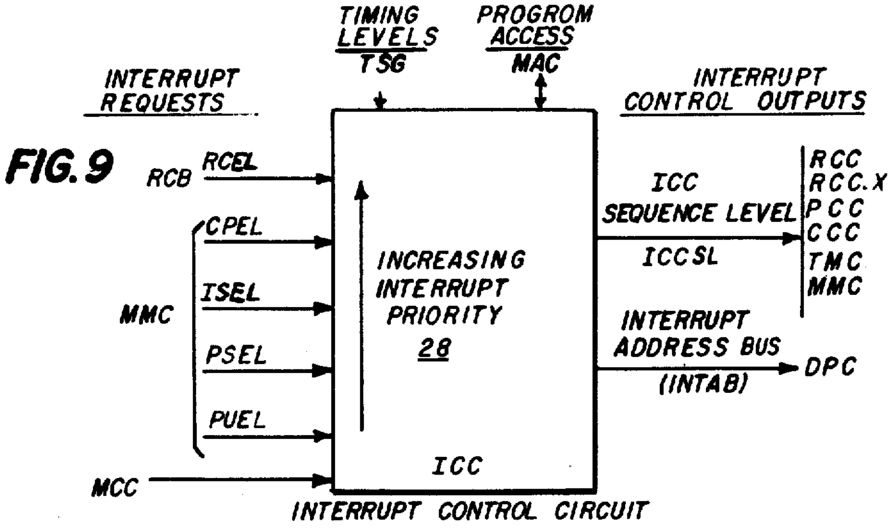
Figure 10:
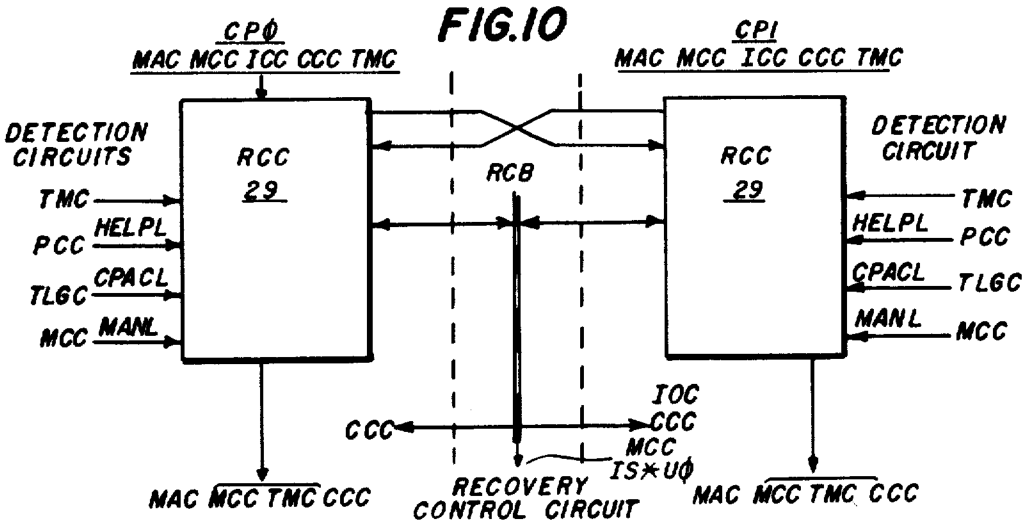
Figure 11:
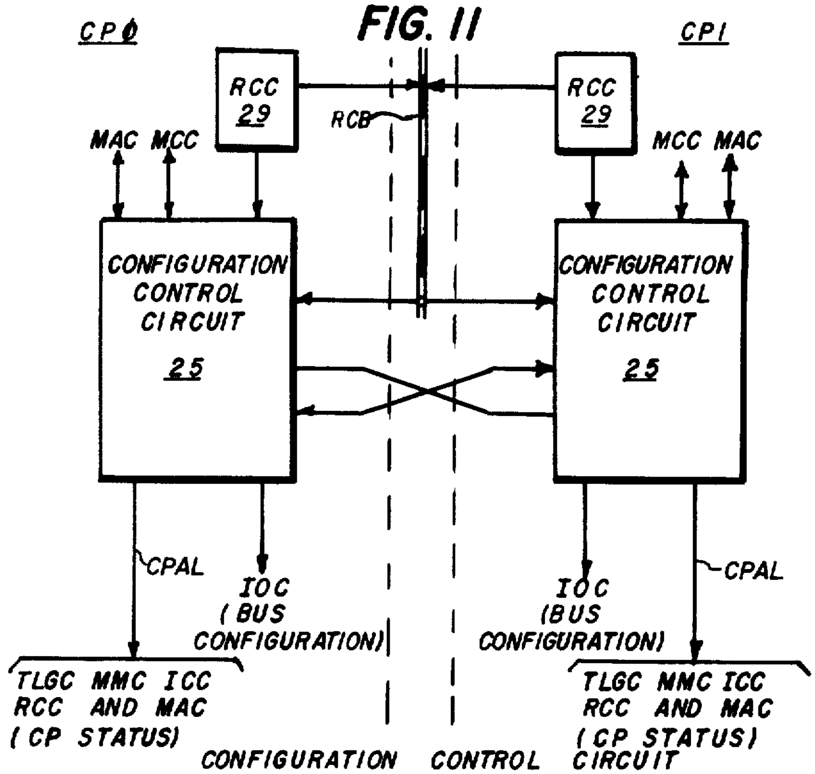
Figure 12:
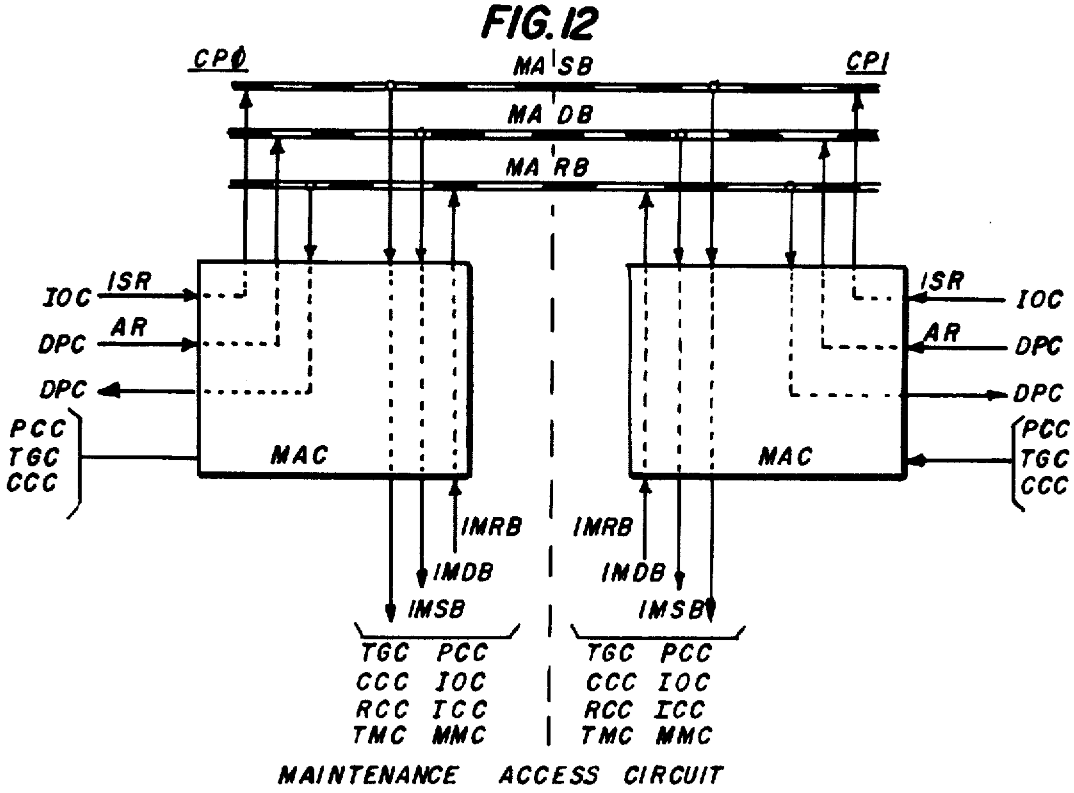
Figure 13:
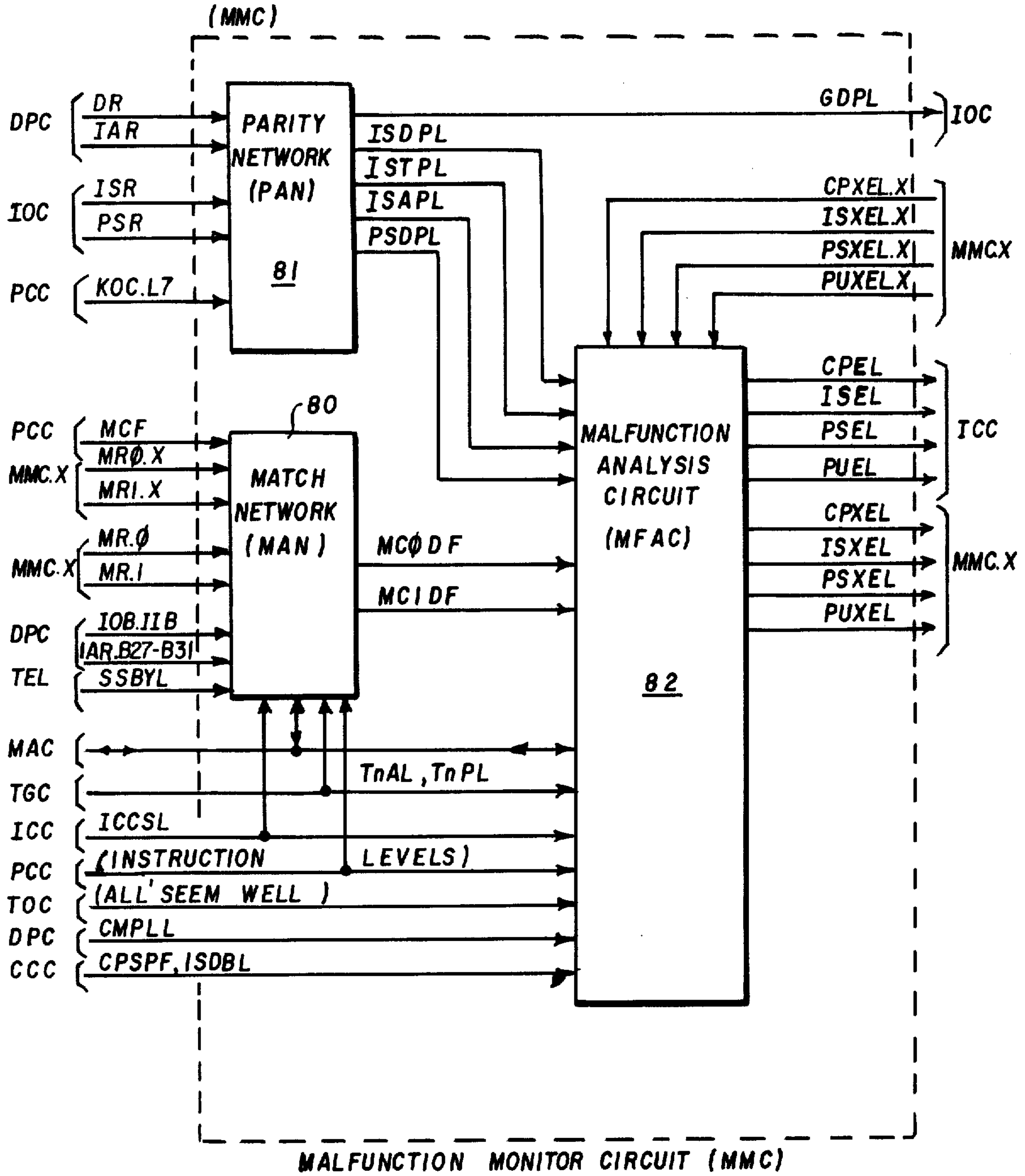
Figure 14:
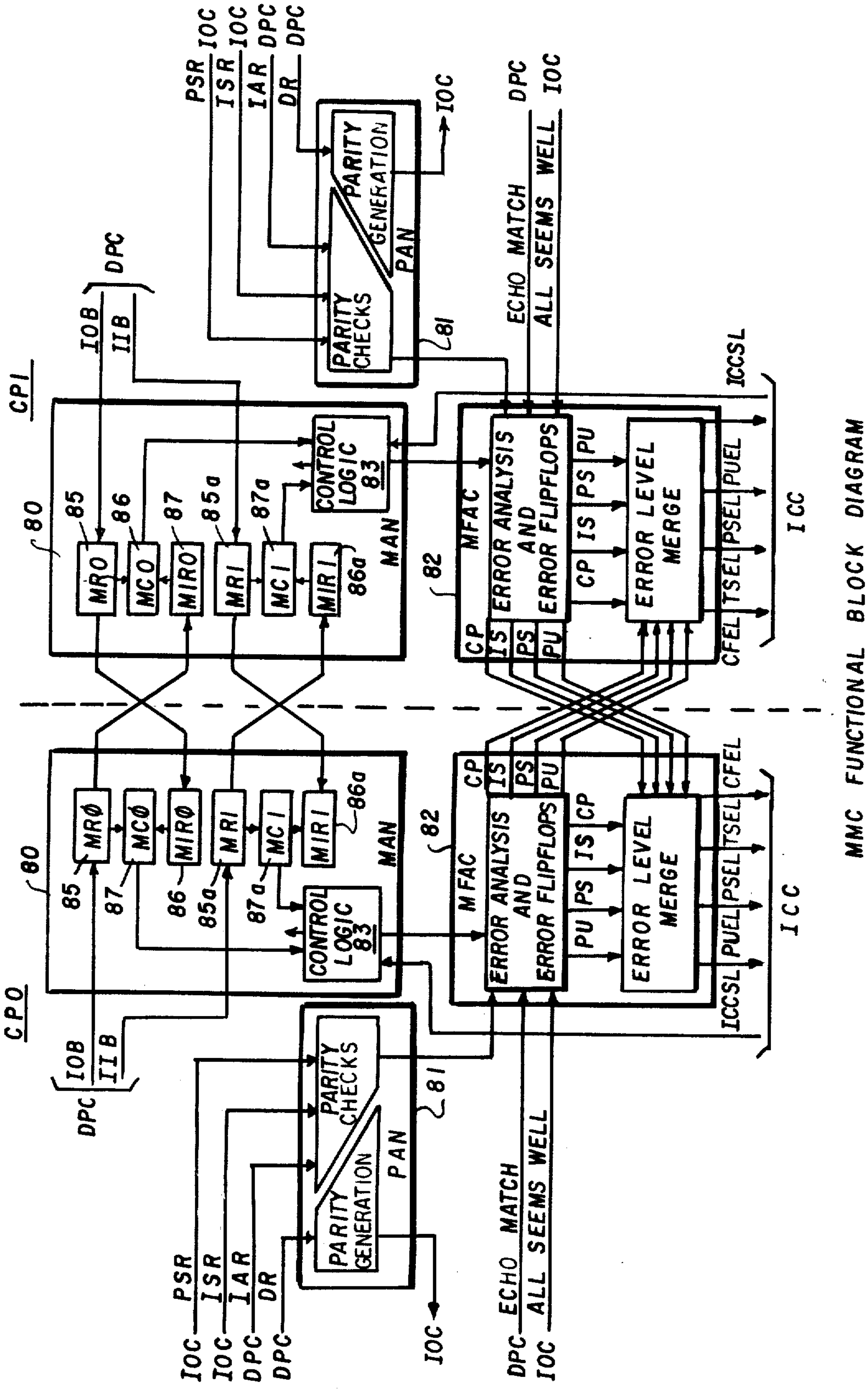
Figure 15:
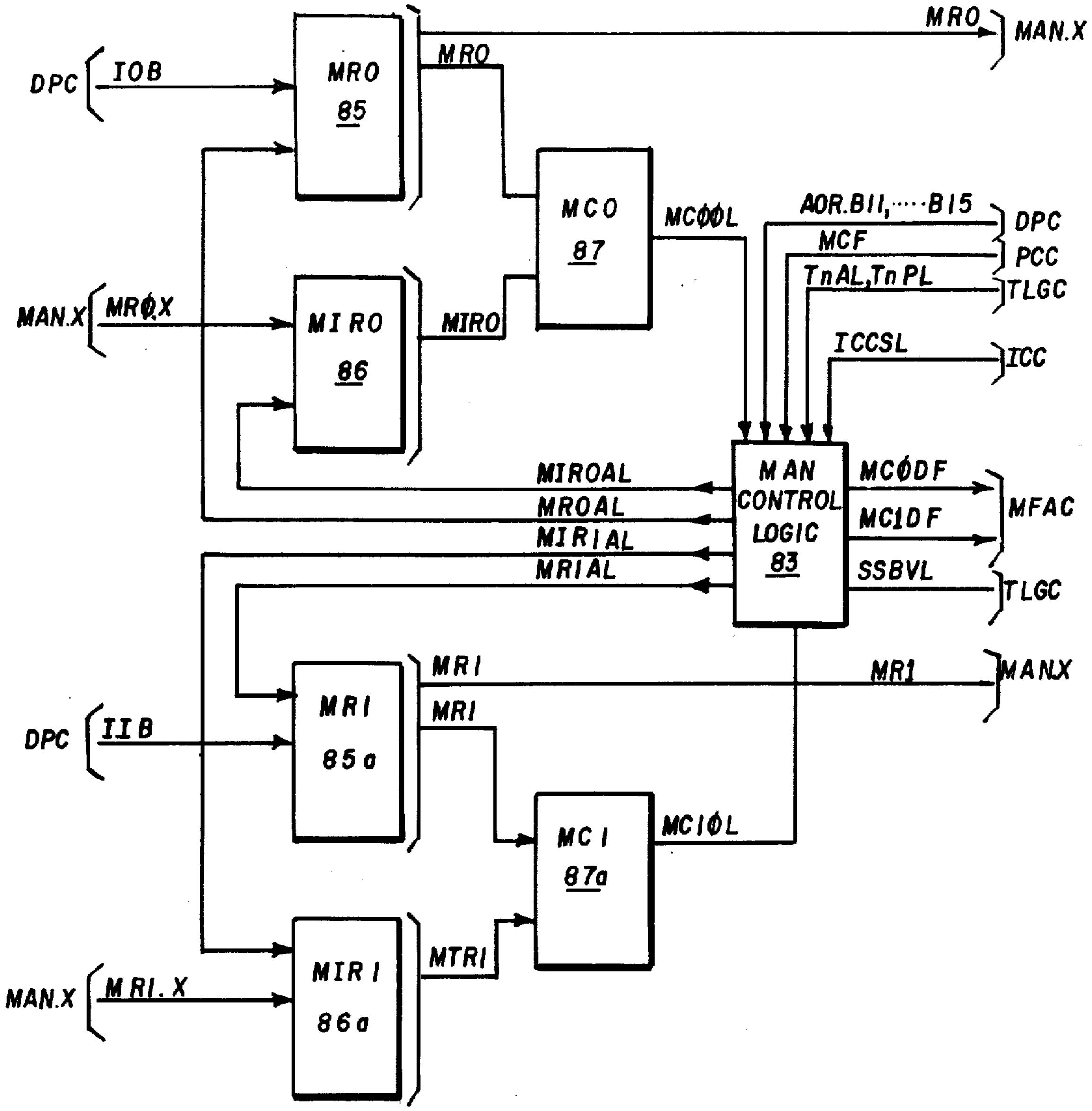
Figure 16:
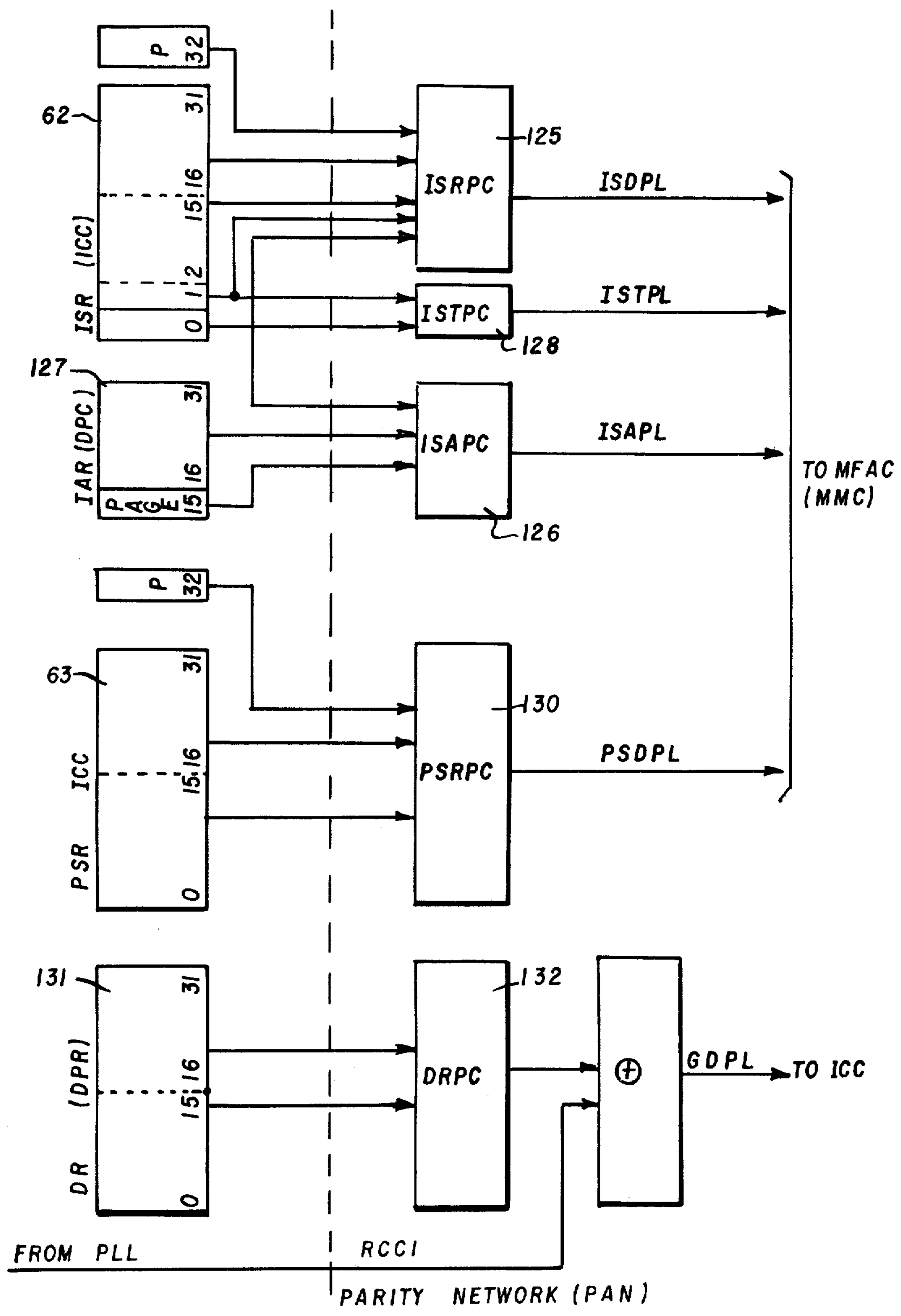

FIG. 3 as a functional block diagram showing communication between both copies of the Central Processor and duplicate copies of the Instruction Store, Process Store, and Peripheral Controller;

FIG. 4 is a functional block diagram of the Timing Generator Circuit of the Central Processor;

FIG. 5 is a functional block diagram of the Processor Control Circuit of the Central processor;

FIG. 6 is a functional block diagram of the Data Processing Circuit of the Central Processor;

FIG. 7 is a functional block diagram of the Input/Output Circuit of the Central Processor;

FIG. 8 is a functional block diagram of the Timing Monitor Circuit of the Central Processor;

FIG. 9 is a functional block diagram of the Interrupt Control Circuit of the Central Processor;

FIG. 10 is a functional block diagram of the Recovery Control Circuit of the Central Processor;

FIG. 11 is a functional block diagram of the Configuration Control Circuit of the Central Processor;

FIG. 12 is a functional block diagram of the Malfunction Monitor Circuit of the Central Processor, FIG. 13 is another functional block diagram of the Malfunction Monitor Circuit showing additional inputs and outputs;

FIG. 14 is a functional block diagram of the Malfunction Monitor Circuit showing cross-coupling between Malfunctin Monitor Circuits existing in separate copies of the Central Processor;

FIG. 15 is a functional block diagram of the Match Network;

FIG. 16 is a functional block diagram of the Parity Network;

FIG. 17 is a table listing for Maintenance Sense Group IV;

FIG. 18 is a table listing for Maintenance Control Group IV; and

FIG. 19 is a logic schematic diagram of the Control Logic for the Match Network of the Malfunction Monitor Circuit.

DETAILED DESCRIPTION

I. Introduction—TSPS

The primary function of the TSPS System is to provide data processor control of the various functions in toll calls which in the past have been performed by operators but have not required the exercise of discretion on the part of the operator. At the same time, the system must permit operator intervention, as required. Thus, various trunks from an end office to a toll center pass through the TSPS System, and these are commonly referred to as access Trunks, functionally illustrated in FIG. 1 by the block 10.

The access trunks 10 are connected to and pass through access trunk circuits in a network complex 11 which is physically located at the same location as the TSPS base unit, and the network complex 11 permits the system to access each individual trunk line to open it or control it, or to signal in either direction. There is no switching or re-routing of trunks or calls at this location. Each trunk originating at a particular end office is permanently wired to a single termination in a remote toll office while passing through a TSPS network complex or trunk circuit en route.

The various access trunks may originate at different end offices, but regardless of origin, they are served in common by the TSPS System and the operators and traffic office facilities associated with that system. Hence, the equipment interfaces with various auxiliary equipment incidental to gaining access to the throughput access trunks, including remote operator positions, equipment trunks, magnetic tape equipment for recording charges, and various other equipment diagrammatically illustrated by the block 12. Additional details regarding the network complex 11 and the auxiliary equipment and communication lines 12 for a TSPS System may be obtained from the *Bell System Technical Journal* of December, 1970, Vol. 49, No. 10.

The present invention is more particularly directed to one aspect of the data processor which controls the telephony—namely the maintenance circuitry in the Central Processor (CP) which controls the systems and performs call procesing as well as maintenance and recovery functions. The Central Processor is shown in simplex form within the chain block 17 of FIG. 1.

It will be observed that the telephony equipment is about three orders of magnitude in time slower, on the average, than is necessary to execute individual instructions in modern high-speed digital computers. For example, for the present system a clock increment for the Central Processor is 4 microseconds whereas the trunk circuits are sampled every 10 milliseconds. Hence many functions can be performed in the Central Processor, including internal and external maintenance, table look-ups, computations, monitoring of different access trunks, system recovery from a detected fault, etc. between the expected changes in a given trunk.

The TSPS System uses a stored program control as a means of attaining flexibility for varied operating conditions. Reliability is attained by duplicating hardware wherever possible. A stored program control system consists of memories for instructions and data and a processing unit which performs operations, dictated by the stored instructions, to monitor and control peripheral equipment.

A Control and Maintenance Complex (CMC) contains the Instruction Store Complex (IS*), Process Store Complex (PS*), Peripheral Unit Complex (PC*), and the Central Processor Complex (CP*). The asterisk designates all of the circuitry associated with a complex, including the duplicate copy, if applicable.

The interface between the telephony equipment and the data processor is the Peripheral Unit Complex which includes a number of sense matrices 13 and control matrices 14 together with a Peripheral Controller diagrammatically indicated by the chain block 15.

The principal elements of the data processing circuitry include the Central Processor (CP) 17, a Process Store (PS) enclosed within the chain block 18, and an Instruction Store (IS) enclosed within the chain block 19. A computer operator or maintenance man may gain manual access into the Central Processor 17 by means of a manual control console 20, if desired or necessary.

The Instruction Store (IS) 19 which consists of two copies, contains the stored programs. Each copy has up to eight units as shown in block 19 and includes two types of memory:

1. A read-only unit **19*a*** containing a maximum of 16,384 thirty-three bit words.
2. Core Memory in remaining units containing a maximum of seven units of 16,384 thirty-three bit words per unit. Individual words are read from or written into IS by CP 17, as will be more fully described below.

Each IS unit 19 of the eight possible is similar; and they are of conventional design including an Address Register 19b receiving digital signals representative of a particular word desired to be accessed (for reading or writing as the case may be). This data is decoded in the Decode Logic Circuit **19*c*; and the recovered data is sensed by sense amplifiers 19*d* and buffered in a Memory Data Register 19*e* which also communicates with the Central Processor 17.**

The Process Store (PS) 18 contains call processing data generated by the program. The PS (also in duplicate copies) comprises Core Memory units **18*a* containing a maximum of eight units of 16,384 thirty-three bit words for each copy. Individual words are read from or written into PS by CP in a manner similar to the accessing of the Instruction Store 19, just described. That is, an Address Register 18*b* receives the signals representative of a particular location desired to be accessed; and this information is decoded in a conventional Decode Logic Circuit 18*c*. The recovered information is sensed by sense amplifiers 18*d* and buffered in Memory Data Register 18*e*.**

The CMC communicates with the telephony and switching equipment through matrices 13, 14 of sense and control devices. Any number of known design elements will work insofar as the instant invention is concerned. The sense and control matrices 13, 14 are each organized into 32 bit sense words and 32 bit control words. On command of CP, PC samples a sense word and returns the values of the 32 sense points to CP. Each control point is a bistable switch or device. To control telephone and input/output equipment, CP sets a word of control points through PC. PC together with the sense and control matrices comprise the Peripheral Unit Complex (PU).

CP sequentially reads and executes instructions which comprise the program, from IS. The CP reads and executes most instructions in 4 microseconds (one machine cycle time). Those instructions that access IS require 8 microseconds require two machine cycles to be executed and are referred to as "dual cycle" instructions.

The instructions obtained from the IS can be considered "Directives" to the CP specifying that it is to perform one of the following operations:

a. Change and/or transfer information inside the CP in accordance with some fixed rule.

b. Communicate with the IS or PS by requesting the IS/PS to either;

1. Read a 33 bit word from a specified location, or
2. Write a 33 bit word into a specified location.

c. Communicate with the PC by requesting PC to either;

1. Read a specified 32 bit from sense point word, or
2. Write into a specified 32 bit control point word.

d. Perform maintenance operations internal to Cp by either;

1. Reading from a maintenance sense group, or
2. Writing into a maintenance control group.

The Control and Maintenance Complex may be viewed from two levels: a processing level and a maintenance level. At the processing level (which includes the control and maintenance of the telephone equipment) the CMC appears to be an unduplicated, single processor system as in FIG. 1. At the maintenance level (which here refers only to CMC maintenance) the CMC consists of duplicated copies of the units in each complex, as seen in FIG. 2.

The duplication within the CMC is provided for three purposes:

1. In the event that a failed unit is placed out-of-service, its copy provides continued operation of the CMC.
2. Matching between copies provides the primary means of detecting failures.
3. In-service units can be used to diagnose an out-of-service unit and report the diagnostic results.

Each complex within the CMC may be reconfigured (with respect to in-service and out-of-service units) independently of the other complexes to provide higher overall CMC reliability.

The CMC operation is monitored by internal checking hardware. In the event of a malfunction (misbehavior due either to noise or to failure), the CP is forced into the execution of a recovery program by a maintenance interrupt.

When the malfunction is due to failure, the recovery program will find the failed copy and place it out-of-service. When at least one complete set of units in each complex can be placed in-service, the fault recovery program will terminate after reconfiguring the CMC to an operational system. If a good set of units in each complex cannot be found, the fault recovery program continues until manual intervention occurs.

To facilitate the recovery operation, a hierarchy of in-service copies are defined:

1. One Central Processor must always be in the active state, only the active CP can change the configuration of the CMC, 2. If the other CP is in-service, that CP is the standby CP, and 3. The in-service copies of Instruction Store, Process Store, and Peripheral Control Units are designated as primary and secondary where the primary copies are associated with the active CP.

Each Peripheral Control Unit may also be designated as active or standby; only the active Peripheral Control Unit controls telephone equipment through the sense and control points. Further, the duplicate copies of IS are designated active and standby according to which one (called the "active" one) is associated with the primary CP.

II. The Central Processor—An Overview

The CP circuits provide two specific functions: processing and maintenance. The processing circuits provide a general purpose computer without the ability to recover from hardware failures. The maintenance circuits together with the processing circuits provide the CMC with recovery capability.

The Central Processor is divided into ten circuits. The first four provide the processing function.

1. Timing Generator Circuit (TGC), designated 21,

2. Processor Control Circuit (PCC), 22. 3. Data Processing Circuit (DPC), 23, and 4. Input/Output Circuit (IOC), 24.

The above four processing circuits are described herein only to the extent necessary to understand the present invention. Additional details may be found in the U.S. Pat. of Brenski, et al, entitled "Control Complex for TSPS Telephone System," U.S. Pat. No. 3,818,455. The subject matter of this application is incorporated herein by reference.

The remaining circuits in the CP provide the maintenance function and these include;

5. Configuration Control Circuit (CCC) 25,

6. Malfunction Monitor Circuit (MMC) 26,

7. Timing Monitor Circuit (TMC) 27,

8. Interrupt Control Circuit (ICC) 28,

9. Recovery Control Circuit (RCC) 29, and

10. Maintenance Access Circuit (MAC) 30.

In FIG. 2, there is shown duplicate copies of each of the above circuits in the Central Processor, with like circuits having identical reference numerals.

Turning back to FIG. 1, a pair of Peripheral Controllers is associated with each Peripheral Control Unit (PCU). Each Peripheral Controller 15 includes the following circuits which are also described in more detail in the above-referenced Brenski, et al patent:

1. A Matrix Access Circuit 33,

2. An Address Register Circuit 34,

3. A Data Register Circuit 35,

4. A Timing Generator Circuit 36,

5. A Maintenance Status Circuit 37,

6. An Address Decoder Circuit 38, and

7. A Control Decode Circuit 39.

The functional interface between the Central Processor, and other system equipment, is shown in functional block diagram form in FIG. 3. As can be seen, there is intercommunication between both copies of the Central Processor designated 17 and 17*a* respectively and the manual control console. Maintenance personnel can monitor the status and manually reconfigure the control and maintenance complex from this console.

As can also be seen in FIG. 3, both Central Processor copies have direct, two-way communication links between each other, via internal bus 35, and with both copies of Instruction Store, designated 36 and 37 respectively, via their associated bus systems 38 and 39. Similar communication is provided with the Process Store, and the Peripheral Controllers. This interface is provided by six separate bus systems.

I. An Instruction Store copy $\phi$ bus system (IS$\phi$. BS) is designated 38. This interfaces both copies 17*a*, 17 of the Central Processor via buses 41, 42 with each of the 8 units (IS$\phi$.U$\phi$ through IS$\phi$.U7) that form Instruction Store copy $\phi$ (IS$\phi$) generally designated 36.

II. An Instruction Store copy 1 bus system (ISI.BS) is designated 39. This interfaces both copies of the Central Processor via buses 43, 44 with each of the 8 units (ISI.U$\phi$) through IS1.U7) that form Instruction Store copy 1 (ISI), generally designated 37.

III. A process Store copy $\phi$ bus system (PS$\phi$. BS) is designated 45; and it interfaces both copies of the Central Processor with each of the 8 units (PS$\phi$. U$\phi$ through PS$\phi$.U7) that make up Process Store copy $\phi$ (PS$\phi$), generally designated 46.

IV. A Process Store copy 1 bus system (PS1.BS) is designated 47; and it interfaces both copies of the Central Processor with each of the 8 units (PSI U$\phi$ through PS1.U7) that make up Process Store copy 1 (PS1), generally designated 48.

V. A peripheral Controller copy $\phi$ bus system (PC$\phi$. BS) is designated 49; and it interfaces both copies of the Central Processor with each of the 8 Peripheral Controllers (PC$\phi$. U$\phi$ through PC$\phi$.U7) in Peripheral Control copy $\phi$ (PC$\phi$), generally designated 50.

VI. A Peripheral Controller copy 1 bus system (PC1.BS) is designated 51; and it interfaces both copies of the Central Processor with each of the 8 Peripheral Controllers (PC1.U$\phi$ through PC1.U7) in Peripheral Control copy 1 (PC1), generally designated 52.

Each copy of the Peripheral Control bus system contains an address bus (PC$\phi$.AB and PC1.AB), a return bus (PC$\phi$. RB and PC1.RB), and a data bus (PC$\phi$. DB and PC1.DB). Each copy of the process store bus system contains an address bus (PS$\phi$.AB and PS1.AB) and a return bus (PS$\phi$.RB and PS1.RB). Each copy of the Instruction Store bus system contains an address bus (IS$\phi$. AB and IS1.AB, and a return bus (IS$\phi$. RB and IS1.RB). Each copy $\phi$ of the Instruction Store bus system and the ProcessStore bus system share the same data bus: Instruction Store and Process Store copy $\phi$ data bus (IP$\phi$. DB). Each copy 1 of the Instruction Store bus system and the Process Store bus system also share the same data bus: Instruction Store and Process Store copy 1 data bus (IP1.DB).

This data bus sharing by Instruction Store and Process Store affects the sequence of instructions that are to be executed by the Central Processor. An instruction directing the Central Processor to access (read from or write into) Process Store requires only one machine cycle, while on instruction directing the Central Processor to access Instruction Store requires two machine cycles. This means that the Central Processor can execute Process Store instructions in sequence, one after the other, for as long as needed, and it can also execute an Instruction Store instruction immediately following a Process Store instruction. However, it cannot execute two Instruction Store instructions, in sequence, nor can it execute a Process Store instruction immediately after an Instruction Store instruction, because of the shared data bus. The Central Processor will have been in the execution of an Instruction Store instruction only one machine cycle of the two required, when it starts executing the next instruction in sequence, and these two instructions cannot use the same data bus (IPϕ. DB) or IP1.DB) simultaneously.

It is believed that a better understanding of the present invention will be obtained if there is an understanding of the overall function of each circuit in the CP, realizing that there are duplicate copies of the CP.

II. A. Processing Circuits of Central Processor

Timing Generator Circuit (TGC)

Figure 1:
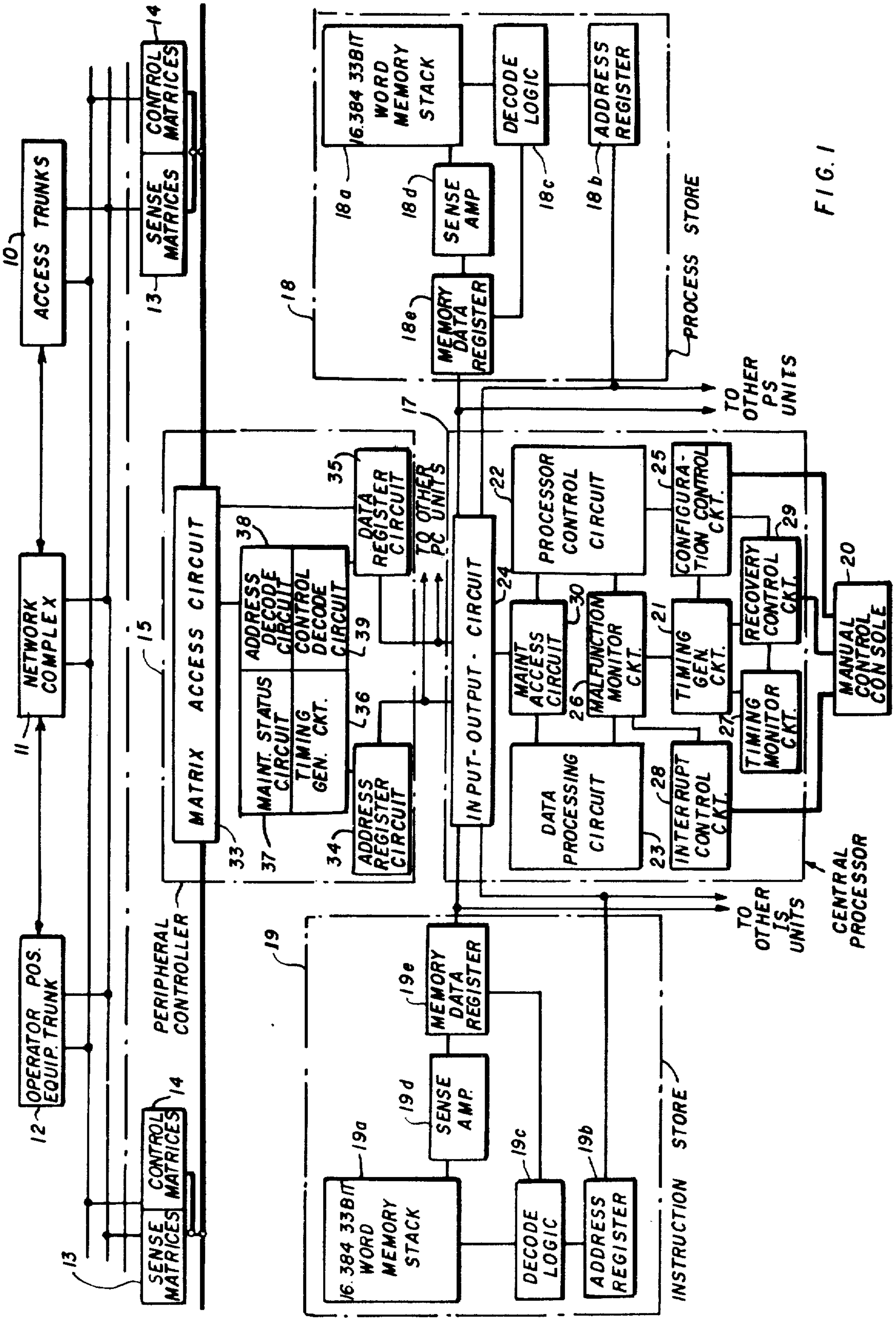
FIG. 1 is a functional block diagram of a TSPS System including a Control and Maintenance Complex.
Figure 2:
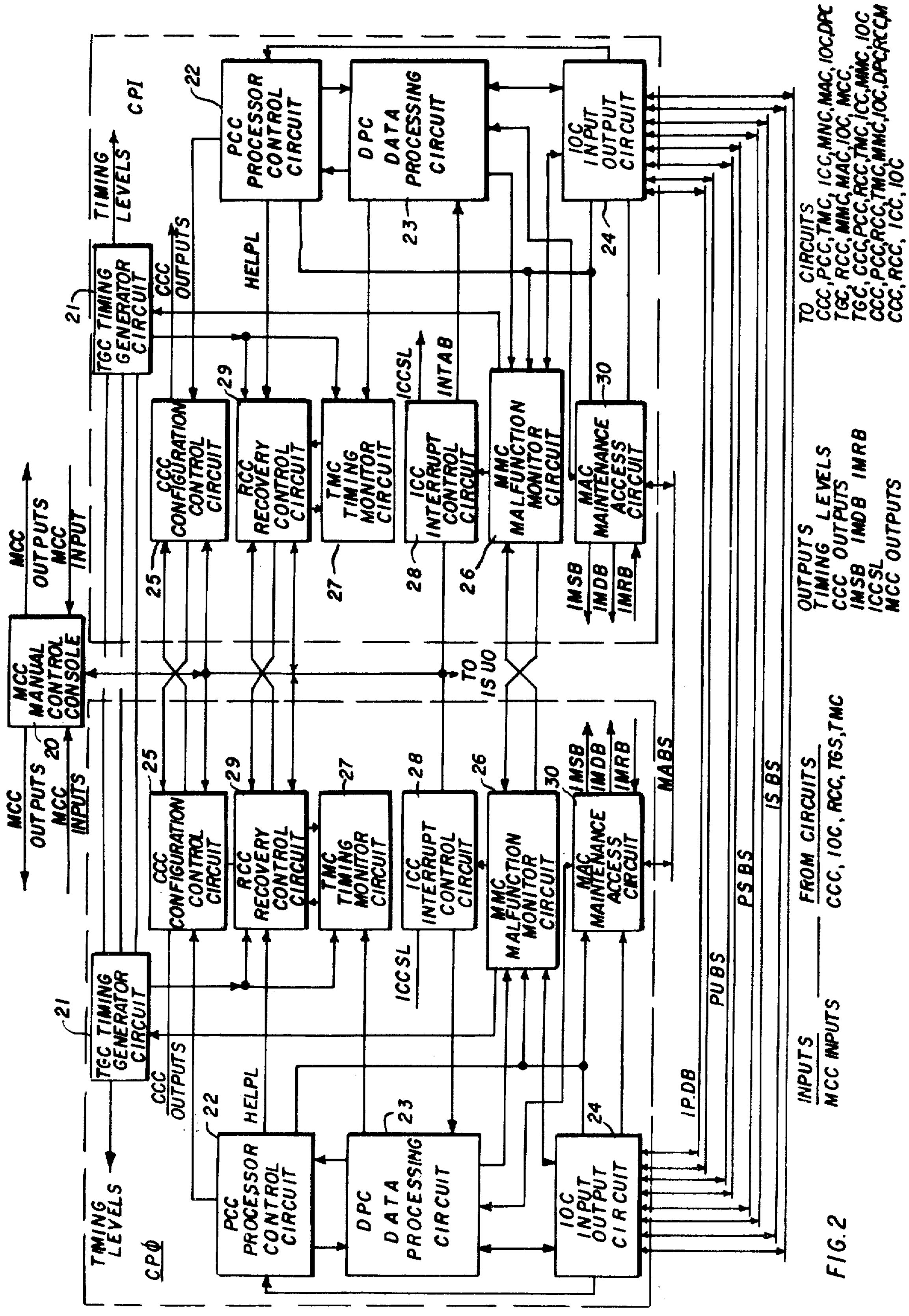
FIG. 2 is a functional block diagram showing redundant copies of the Central Processor and their associated busing systems.

The Timing Generator Circuit 21 of FIGS. 1 and 2 (TGC) creates the timing intervals for the Central Processor. A more detailed functional block diagram for the TGCs of both Central Processors is shown in FIG. 4.

The TGC includes a level generator circuit 50 and creates eight timing intervals (or "levels" as they are referred to) every 4 $\mu$seconds. Each pulse is picked off a delay line. For each timing interval, TGC produces a 500 nano second (ns) timing interval place level (PL) and a 400 ns. timing interval accept level (AL). Each sequence of 8 timing intervals is called a cycle. Nearly all sequential control in the CP is provided by the timing interval place and accept levels.

Generally, the timing interval place levels are used to gate information out of flip-flop storage while timing interval accept levels are used to accept information into flip-flop storage.

The TGC in each CP generate timing levels. To assure synchronism between CP's, Timing levels generated in the active CP control both CP's. A switching network 51 actuated by a switching control circuit 52 in each TGC transmits (if it is in the active CP) or receives the timing levels from the active TGC, and supplies them to the CP circuits. The standby CP may be stopped by directing the TGS in the standby CP to inhibit reception of timing levels. The TGS also notifies the Recovery Control Circuit 29 (RCC) and Timing Monitor Circuit 27 (TMC) for maintenance purposes whenever the CP's active/standby status changes.

Processor Control Circuit (PCC)

The PCC 22 (see FIG. 5 for a more detailed functional block diagram) includes instruction fetch and decode circuits 53 which decode each instruction and generate the control signals required to execute the instruction and to read the next instruction from IS.

The instructions are performed in the DPC 23 by a sequence of data transfers—one in each of the eight timing intervals. Each data transfer is controlled by three simultaneous command from the PCC to the DPC:

1. A register place command (generated in block 54) which places a DPC register or circuit on the Interval Output Bus of the PCC.

2. A Bus Transfer Command (generated in bus transfer control circuits 55) which transfers the information on the Internal Output Bus to the Internal Input Bus, and

3. A register Accept Command (also generated in block 54) which gates the information on the Internal Input Bus to a DPC register.

The PCCalso provides auxiliary commands to the DPC such as the selection of the function to be provided by the Logic Comparator Circuit (LCC).

Memory and peripheral unit control circuits 55 of the PCC provide the control signals to the IOC including the mode bits to be transmitted to these complexes.

The instruction fetch logic of block 53 controls an Instruction Address Register IAR, Add One Register AOR, and the instruction store read for the next instruction. The next instruction is read from the Instruction Store simultaneously with the execution of its predecessor.

The PCC also decodes the HELP instruction which is an input to the RCC that initiates a system recovery program interrupt. The instructions RMSG, WMSG, and WMCP are decoded by the PCC but are executed by the Maintenance Access Circuit 30 (MAC). The Malfunction Monitor Circuit 26 (MMC) require decoded instructions levels from the PCC in order to sample malfunction detection circuits.

Data Processing Circuit (DPC)

The DPC 23 (see also FIG. 6) contains the registers of the CP and the circuits required to perform arithmetic, logical, decision, and data transfer operations on the information in these registers. The General Registers (GR1, . . . , Gr7), in the Storage Section 56, the Special Purpose Register (SPR), also in Storage Section 56, and the Instruction Address Register (IAR) in the Address Section 57 are the program accessible registers. These registers and the operations which are performed on these registers by individual instructions are described more fully in the above-referenced U.S. Patent.

The remaining registers [Data Register (DR) and Arithmetic Register (AR) in Data Section 58, the Selection Register (SR), and Add One Register (AOR)] and circuits (Logic Comparator Circuit (LCC), Add Circuit (ADC) the Add One Circuit (AOC), and the Bus Transfer Circuit 59 (BTC) provide the data facilities required to implement the instruction operations on the program accessible registers.

A 32 bit Internal Input Bus (IIB) 60 is the information source for all DPC registers. In general, the DPC registers and circuits as well as other CP circuits place information on the 32 bit Internal Output Bus (IOB) 61. The Bus Transfer Circuit (BTC) 59 transmits information from the IOB 61 to the IIB 60. The information can be transferred in six ways which include complementing or not complementing the information, exchanging 16 bit halves (with or without complementing), or shifting the information left or right one bit.

A logic and compare circuit (LCC) provides a 32 bit logical AND, NOR, or EQUIVALENCE of the AR and DR and also matches the AR and DR. The ADD Circuit (ADC) provides the sum of the left half of the AR and the right half of the AR. The ADC is used for addition and subtraction and to generate PS and PU addresses. The 17 bit Instruction Address Register (IAR) is used to address the Instruction Store. The Add-One-Circuit (AOC) increments the right most 16 bits of the IAR by one. The AOC is used to compute the next instruction address (one plus the current address) which will be used if a Program Transfer does not occur.

Input Output Circuit (IOC)

The primary function of the IOC 24 (see also FIG. 7) is to provide the interface through which the Central Processor complex (CP*) gains access to the non-CP complexes (IS*, PS*, and PC*) via the external bus system. As seen diagrammatically in FIG. 7, the IOC sends data and addresses from the CP to the non-CP complexes and also receives and buffers data transmitted to the CP from non-CP complexes. The external bus system, used to transmit information between CP* and the non-CP complexes, comprises the Instruction Store Address Bus (IS*.AB), Process Store Address Bus (PS*.AB), Peripheral Control Address Bus (PC*.AB), Instruction Store-Process Store Data Bus (IP*.DB), Peripheral Control Data Bus (PC*DB), Instruction Store Return-Bus (IS*.RB), Process Store Return Bus (PS*.RB), and Peripheral Control Return Bus (PC*.RB).

Each bus consists of two copies which are associated with corresponding copies of IS*, PS*, and PC*. At the processing level, the IOC may be considered to use both copies of the bus without distinction between the copies. To provide the reconfiguration capability (maintenance level), the IOC transmits on or receives from copy $\phi$, copy 1, or both copies of a particular bus. The choice of bus copies is determined by the Configuration Control Circuit 25.

There are three buffer registers in the IOC: the Instruction Store Register (ISR) designated 62, the Process Store Register (PSR) 63, and the Peripheral Unit Register 64. These registers communicate with both copies of the Return Buses from IS, PS and PU respectively; and they send received data to the DPC 23 and MMC 26, as shown.

II. B. Maintenance Circuits

The functions performed by the CP maintenance circuits include the following:

1. System configuration control (CCC 25),

2. Malfunction detection (MMC 26, TMC 27, DPC 23),

3. Recovery program initiation (ICC 28),

4. Recovery program monitoring (RCC 29, TMC 27),

5. Maintenance program access to CP circuits (MAC 30, MMC 26), and

6. Manual system control (MCC 20). The CMC detects malfunctions as follows:

1. By matching, between CP copies, all data transfers in the CP Data Processing Circuit (MMC),

2. By parity checking of all memory read operations (MMC),

3. By monitoring internal checks by the IS*, PS*, and PC* (all-seems-well checks),

4. Address echo matching of addresses sent to IS*,PS*, and PC* with the echo address returned by the complex (DPC),

5. Timing level generating checking (TMC), and

6. Excess program time checking (DPC).

When a malfunction is detected by MMC 26, the Interrupt Control Circuit (ICC) 28 may initiate a maintenance interrupt to a recovery program. The recovery program attempts to locate the faulty unit, remove it from service, and reconfigure the complexes to a working system. The execution of the recovery programs are monitored by the TMC 27 and the RCC 29. The system recovery program is initiated (reinitiated) by the TMC 27 and the RCC 29 when higher level recovery is required. The Timing Monitor Circuit monitors recovery programs through the Recovery Program Timer (RPT) in the TMC 27 (see FIG. 8). If a recovery program fails to remain in synchronism with this timer, the TMC initiates (or re-initiates) the system recovery program through the Recovery Control Circuit. The execution of a HELP instruction may also initiate (re-initiate) the system recovery program directly through the RCC.

Malfunction Monitor Circuit (MMC)

The MMC 26 (seen in more detail in FIG. 14) provides the following maintenance functions:

1. Detection of malfunctions during the execution of programs,

2. Classification of malfunctions into CP*, IS*, PS*, and PC* caused malfunctions,

3. Indication of a CP, IS, PS, or PC malfunction occurrence to ICC in each CP,

4. Storage of malfunction indications on error flip-flops,

5. Storage of the address of the instruction being executed when a maintenance interrupt occurs,

6. Special facilities for use by recovery programs,

7. Access to standby CP for extraction of diagnostic data through the match facilities,

8. Facility to monitor standby CP executing off line maintenance programs (Parallel Mode), and

9. Facilities for routining the MMC itself.

The Malfunction Monitor Circuit 26, shown is divided into the following three sub-circuits:

1. MAtch Network (MAN), designated 80,

2. PArity Network (PAN), designated 81, and

3. Malfunction Analysis Circuit (MFAC), designated 82.

The MAtch Network (MAN) provides all inter-Central Processor matching facilities. In addition to malfunction detection, the match network can be used for extracting diagnostic data from the standby CP for routining the match network itself. The control logic within the MAN controls the match network according to match modes selected by the maintenance programs.

The PArity Network 81 (PAN) contains all the Parity Circuits used in checking the transmission and storage of information in the Instruction Store (IS*) and Process Store (PS*).

The Malfunction Analysis Circuit 82 monitors malfunction detection signals from

1. MAN (inter CP matching),

2. PAN (parity checks),

3. DPC (address echo match), and

4. IOC (all-seems-well signals).

The malfunction detection signals are sampled according to the timing intervals and instructions being executed. When a malfunction is detected an error flipflot associated with the detection circuit is set to be used by maintenance program to isolate the source of the malfunction.

The malfunction analysis circuit classifies the malfunction according to its most likely cause (CP*, IS*, PS*, Or PC*) and a corresponding error level (CPEL, ISEL, PSEL, or PUEL) is sent to the Interrupt Control Circuit (ICC) in both CP's.

Timing Monitor Circuit (TMC)

The TMC 27 (FIG. 8) provides three timing malfunction detection circuits:

1. Timing check circuit 73 which checks the timing levels generated by TGC,
2. A Real Time Timer Error FF (RTEIF) 74 which monitors the state of the overflow of the Real Time Timer RTT in DPC, and
3. A recovery Program Timer (RPT) 75 which monitors recovery program execution.

Most failures of the active Timing Generator Circuit (TGC) do not cause inter-CP mismatches. These failures are detected by the TGC checking circuitry of the active TMC. The output of this Circuit is monitored by the active Recovery Control Circuit (RCC).

Failures of the standby TGC will cause inter-CP mismatches and are detected by the Malfunction Monitor Circuit. The standby RCC ignores error outputs of the standby TMC.

RTT, which is located in the DPC, has both an operational and a maintenance function. It provides real time synchronization for the operational programs and a sanity check on the execution. The RTT is a fourteen bit counter which is incremented by one every CP cycle (4 microseconds). The program may read or modify RTT through the Special Purpose Register (SPR). In this manner, RTT can provide time intervals of up to 65 milliseconds for the operational programs. The programs, however, must reinitialize RTT often enough to prevent the overflow from occurring. The active RCC monitors the RTT overflow. If the overflow occurs, RTEIF is set and the RCC initiates the system recovery operation.

RPT checks the execution of the Recovery programs. RPT is a seven bit counter which, when enabled, is incremented by one every CP cycle. RPT is enabled whenever a maintenance interrupt occurs and is disabled by the recovery program through MAC when recovery is completed.

The active RCC monitors the RPT of the active TMC and initiates further system recovery operations if the recovery programs fail to reset the RPT in the correct interval. The RPT has two checking modes. When first enabled by a maintenance interrupt, the recovery program must check into the RPT through the SPR exactly every 128th cycle. The recovery program may change the checking mode to permit check-in before the 128th cycle. In the second mode, check-ins may not be more than 128 CP cycles apart. The recovery program changes the checking mode or disables the RPT through MAC and must do it at exactly the 128th cycle.

Interrupt Control Circuit (ICC)

The ICC 28 (FIG. 9) controls the execution of maintenance interrupts. A maintenance interrupt is a one-cycle wired transfer instruction which causes the CMC to begin execution of a recovery program. The malfunction detection circuits in the CP initiate maintenance interrupt whose execution takes precedence over the execution of any other CP instructions.

The ICC provides five maintenance interrupts:

1. System Recovery.
2. CP recovery,
3. IS recovery,
4. PS recovery, and
5. PU recovery.

When an interrupt occurs, the ICC products an ICCinterrupt Sequence Level (ICCSL) which controls the execution of the interrupt in the other CP circuits. The recovery program address corresponding to the interrupt is also placed on the INTerrupt Address Bus (INTAB) to the Data Processing Circuit, from which it is sent to the IS.Uφ as the address of the next instruction to be executed.

The Malfunction Monitor Circuit initiates the CP, IS, PS, and PU recovery interrupts. The Recovery Control Circuit or the Manual Control Console initiates the system recovery interrupt. An interrupt may be initiated by either circuit during the execution of an operational program when a malfunction occurs. During the execution of a recovery program additional interrupts may occur as a part of the recovery process.

To handle simultaneous interrupts and interrupts during execution of a recovery program, the ICC produces maintenance interrupts according to a priority structure. The system recovery interrupt has highest priority and cannot be inhibited. The CP, IS, PS, and PU interrupts follow respectively in descending order of priority. A CP, IS, PS, or PU interrupt can occur if the interrupt itself or a higher priority interrupt has not already occurred. CP, IS, PS, and PU interrupts may be individually inhibited by the maintenance programs.

Recovery Control Circuit (RCC)

The RCC 29 (shown in duplicate copy in FIG. 10) monitors the malfunction detection circuits which cause system recovery program interrupts. The detection inputs to the RCC (RCC triggers) are produced by the timing generation check circuit in the TMC, error level from the DPC, the Recovery Program Timer in the TMC, a HELP instruction executed by the PCC, CP active unit change detected by the TGC, and a manual request from the MCC.

Only the active RCC accepts triggers and initiates system recovery action. The RCC in the Standby CP is kept in synchronism with the active RCC but cannot affect the operation of the CMC.

When a trigger to the active RCC occurs, the RCC executes a wired logic reconfiguration program and then requests the ICC to execute a system recovery program interrupt. If the system recovery program cannot be completed (i.e., the configuration is not operable), another trigger occurs. Each consecutive trigger causes the RCC to force one of the four combinations of CP*, and IS*.Uφ configuration CPφ-ISφ. Uφ, CP1-USφ. Uφ, CP1-ISI.Uφ, and CPφ-ISI.Uφ). When an operating CP*-IS*.Uφ configuration is selected, the system recovery program completes the recovery and reconfiguration process without further intervention by the RCC.

Configuration Control Circuit (CCC)

The CCC 25 (FIG. 11) defines the system configuration by controlling:

1. CP* status, and

2. The CP*-IS&, CP*-PS*, and CP*-PC* configurations.

The CP status is specified by:

1. The active CP indication,
2. The standby CP trouble status, and
3. The CP-CP error signal status (separated CPs or coupled CPs).

Each of the IS*, PS*, and PU*, has a bus system (address bus, data bus—the PS and IS share a data bus, and return bus). Each copy within IS*, PS*, and PU* is permanently associated with an individual bus copy. The CCC defines the CP*-IS*, CP*-PS*, and CP*-PC* configurations by specifying the bus copy on which each CP copy sends and receives.

The CCC first defines a primary bus copy for each of the IS, PS, and PC bus systems. The active CP always sends and receives on the primary bus. The standby CP sends and receives according to the specific bus configuration. For each primary bus copy selection, four bus configurations can be defined:

1. DUPLEX specifying that the standby CP sends on and receives from the non-primary bus copy,
2. SIMPLEX specifying that the standby CP receives from the primary bus copy while the non-primary bus copy is not used,
3. MERGED specifying that the active CP sends on both bus copies and both the standby and active CP's receive from both bus copies (i.e., the return buses are merged), and
4. SIMPLEX-UPDATE specifying that the active CP sends on both bus copies to update the secondary memory copies but the standby CP receives from the primary bus copy only.

The duplex bus configuration is used when both CP's and all units on both buses are in-service. The simplex configuration is used when a unit on the secondary bus is out of service. The merged configuration is used when units on both the primary and secondary buses are out-of-service. The update configuration is used while updating an in-service unit on the secondary bus.

A diagnostic bus configuration is also available for IS* which is used in the diagnosis and recovery of IS*.

Maintenance Access Circuit (MAC)

The MAC 30 (FIG. 12) provides maintenance program access to the CP circuits. Read Maintenance Sense Group (RMSG) is an instruction which allows a group of 32 sense points from either the active or the standby CP to be read into a general register (GR1-GR2 of the Data Processor Circuit 23, see FIG. 6). Write Maintenance Control Group) (WMCG) and Write Maintenance Control Point (WMCP) are instructions which respectively allow the program to write a group of 32 maintenance control points or a single control point in either the active CP, the standby CP, or both CPs. In this context, "writing" means that each maintenance control point sets or resets one or more flip-flops.

Although the instructions are decoded and controlled by the PCC, as explained more fully in the above-identified Brenski, et al, U.S. Pat. No. 3,818,455, MAC selects the control groups, transmits write data from the DPC to the maintenance control groups selected, and reads maintenance sense groups returning data to the DPC.

Maintenance sense and control groups in either the active or standby CP are always selected by the MAC in the active CP only. Write data for maintenance control groups is also always taken only from the MAC in the active CP. In other words, only the MAC in the active CP can execute MAC instructions.

Power Monitor Circuit (PMC)

A Power Monitor and Control Circuit (PMC) (not shown) controls the actions necessary to turn power on or off from a CP or controls the actions necessary to remove power from a CP in which there is a defective power supply.

In case of trouble in a power supply of a CP copy, the PMC will remove all remaining power supplies from that copy.

When power is turned back onto the CP, the PMC will guarantee that the power can be turned on only to the standby CP while keeping the other CP active.

III. MALFUNCTION MONITOR CIRCUIT

Overview

The Malfunction Monitor Circuit (MMC) (denoted 26 in FIG. 1) checks Central Processor operations with malfunction detection circuits that use logical redundancy as their basis for detection. Time-based malfunction detection circuits are located in the Timing Monitor Circuit (TMC) 27.

The MMC performs the following functions:

a. detection of malfunctions during the execution of operational programs, b. classification of malfunctions into CP*, IS*, PS*, and PU* caused malfunctions (the * indicates either copy), c. indication of a CP, IS, PS, or PU malfunction occurrence to the Interrupt Control Circuit 28 in each CP, d. storage of the malfunction indication on error flip-flops, e. storage of the address of the instruction being executed when a maintenance interrupt occurs, f. special facilities for use by recovery programs, g. access to other CP for extraction or insertion of date (in co-operation with MAC 30), h. facility to monitor standby CP executing off line maintenance programs (Parallel Mode), and i. facilities for routining the MMC itself. The MMC contains hardware to:

a. compare (between CP's ) all data transferred on the interenal CP buses IOB and IIB (see 60 and 61 in FIG. 6).

b. check parity of data received in the IOC 24 of the "home" CP (i.e. the CP in which it resides) from IS and PS (on read instructions).

In addition, MMC 26 receives the following externally developed check and error signals:

a. "All seems well" (ASW) signals, that are received by IOC 24 (of the home CP) from PS, IS, or PU in response to "read" and "write" instructions.

b. The "Compare Left Level" CMPLL from DPC in home CP. The DPC compares the address echo returned by responding unit on read and write PU, write PS and write IS instructions, with address sent out. CMPLL becomes 1 on match.

c. Error levels generated by MMC of the external CP.

The MMC comprises three main subsystems, shown in FIG. 13.

MAN: MAtch Network 80,
PAN: PArity Network 81, and
MFAC: MalFunction Analysis Circuit 82.

Briefly, the Match Network MAN 80 contains the hardware for the inter-CP matching and data-transfer facilities. A logic control section shown functionally in block 83 of FIG. 15 enables MMC to operate in several modes, as will be discussed. These modes are established under program control (WMCG, WMCP instructions), via MAC 30.

MAN produces two outputs: MCϕDF and MC1DF, to be explained presently, which feed into malfunction analysis circuit MFAC. It also produces the "Stop-Standby CP Level" SSBYL which is fed to Timing Generator Circuit (TGC) 21.

Briefly, Parity Network (PAN) 81 contains four parity circuits to check parity of data returned by IS* and PS*. The outputs ISDPL, ISTPL, ISAPL and PSDPL, which become true on detection of correct (odd) parity, are fed into MFAC 82 for analysis. A fifth parity circuit generates the data-parity bit GDPL which is transmitted via IOC 24 to IS* or PS* during memory write operations.

Briefly, the Malfunction Analysis Circuit (MFAC) 82 is fed by malfunction indications from MAN 80, PAN 81, and the external indicators from DPC 23 and IOC 24 in the home CP. Usually it also receives the error levels that are cross-coupled from MMC.X (in the mate-CP), but this cross-coupling can be inhibited, as will be explained.

The error indicators are sorted out with the aid of timing levels from TGC and instruction levels from PCC 22. In this way, MFAC 82 classifies the malfunction according to its most likely cause and produces the corresponding error level CPEL (Central Processor Error Level), ISEL (Instruction Store Error Level), PSEL (Process Store Error level), or PUEL (Peripheral Unit Error Level). The error levels are transmitted to the Interrupt Control Circuit (ICC) 28 in both CP's by cross-coupling them between the MMC's.

Match Network (MAN)

The Match Network 8 is shown in detail in FIG. 15. It includes systems and the MAN control logic 83.

Match system ϕ includes:

MRϕ: Match Register Zero (32 bits) denoted 85;

MIRϕ Match Image Register Zero (32 bits), 86; and

MCϕMatch Circuit Zero 87. Output MCϕOL is true (or 1) on mismatch between the registers.

Match system 1 includes:

MR1: Match Register One (32 bits) 85*a;*

MIR1: Match Image Register One (32 bits) 86*a*; and

MC1: Match Circuit One 87*a*. Output MC1OL is true on mismatch between the registers.

Functions Of Match Systems — During Matching

MRϕ 85 accepts data on IOB 60 of the home-CP when MRϕAL = 1 1

MIR0 86 accepts data from MR0 of the external CP when MIR0AL = 1

MR1 85*a* accepts data on IIB 61 of the home-CP when MR1AL = 1

MIR1 86*a* accepts data from MR1 of the external CP when MIR1AL = 1

When MAN 80 is matching:

MRϕAL = 1 during even timing intervals

MR1AL = 1 during odd timing intervals

MIRϕAL and MIR1AL = 1 continuously

As a result, when MAN is matching in both CP's:

Match System Zero compares data on IOB of both CP's during even timing intervals (Tϕ, T2, etc.).

Match System One compares data on IIB of both CP's during odd timing intervals (T1, T3, etc.).

When Matching Is Inhibited

Matching inhibited makes the four accept levels from control logic 83 "false."

During these periods, the following operations involving the match registers are possible:

a. Contents of Match registers in either CP can be copied into CP general registers by MAC in active CP by executing a RMSG instruction.

Outputs of MRϕ appears in MSGϕ

Outputs of MIRϕ appears in MSG1

Outputs of MR1 appears in MSG2

Outputs of MIR1 appears in MSG3 b. Individual Match registers in either CP can be cleared by MAC in active CP (program controlled, with WMCG or WMCP instruction) (see FIG. 18).

MRϕR (control point 16 in MCG4) resets MRϕ

MIRϕR (control point 17 in MCG4) resets MRIϕ

MR1R (control point 18 in MCG4) resets MR1

MIR1R (control point 19 in MCG4) resets MIR1 c. Contents of CP general registers can be written into individual (previously cleared) Match Registers in either CP by MAC in active CP (under program control, with WMCG instruction).

MCGϕ contains control points setting bits in MRϕ

MCG1 contains control points setting bits in MIRϕ

MCG2 contains control points setting bits in MR1

MCG3 contains control points setting bits in MIR1

These provisions enable extraction of data from standby CP for diagnosis, entering data into standby CP for initialization and routining and diagnosis of the Matching System themselves.

Matching Options — MAN Control FF's

There are several options for each of the three aspects that determine the behavior of MAN 80. These options are selected under program control, by setting appropriate flip-flops (discussed below) in the MAN control logic 83.

Options For Matching Mode

Two options exist:

a. Continuous Matching: matching continues until an abnormal match condition is detected or an interrupt occurs.

b. Sampled Matching: matching starts at beginning of a specified cycle and terminates at end of this cycle or on detection of abnormal match condition, whichever occurs first.

| MAENFϕ | SMENF | |
|---|---|---|
| 0 | 0 | No Matching |
| 1 | 0 | Continuous Matching |
| 0 | 1 | Sampled Matching |

These modes are initiated under program control (WMCG or WMCP instructions). The control points for MAENFϕ (see flip-flop 90 in FIG. 19) and SMENF 91 are located in MCG4 (see FIG. 18). Flip-flop outputs appear in MSG4 for sensing (see FIG. 17).

When continuous matching mode is initiated via MAC, matching starts at TLϕ of next cycle.

The starting cycle for sampled matching is keyed to the five low-order bits of the address of instruction or data word in the Instruction Address Register (LAR.B27-B31), see block 57, FIG. 6. These five bits are loaded in a counter SMAMC, denoted 95.

MAN control logic contains a five bit Sample Match Address Register — SMAR.Bϕϕ-Bϕ4 92 and the CYC2F flip-flop 93. SMAR is initialized (clear first, then set desired bits) via MAC. The control points for SMAR and CYC2F are located in MCG4 (see FIG. 18).

When CYC2F = 0, matching *starts* at *beginning* and *stops* at *end* of first cycle of the instruction whose five low-order address bits match the contents of SMAR 92.

When CYC2F = 1, matching *starts* at *beginning* and *stops* at *end* of the second, or later cycle that addresses an IS word whose five low-order address bits match SMAR 92 (RIS, RISN, RISA, RIST, WIS, WISD, WISN, XEC and XECN instructions).

Options For Selection Of Abnormal Match Condition

MAN can be conditioned to consider either mismatches (MCϕOL or MC1OL = 1) or matches (MCϕOL or MC1OL = 0) as abnormal conditions. The occurrence of an abnormal condition in Match System ϕ(1) produces outputs MCϕDF = 1 (MC1DF = 1) during the two timing intervals following its detection. These signals are inputs to MFAC 82. The occurrence of an abnormal condition also inhibits further matching by freezing the four Match Registers **85, 85*a*, 86 and 86*a***.

Flip-flop DMMF 97 controls this option:

DMMF =1: mismatches are considered abnormal

0: matches are considered abnormal

DMMF is program controlled via MAC. Its control points are located in MCG4 (see FIG. 18).

Options To Enable Timing Intervals

The MAN control logic contains eight other flip-flops; TϕMSF through T7MSF designated 100-107 in FIG. 19. Abnormal conditions detected by the match systems during individual timing intervals only produce error indications (MCϕDF or MC1DF = 1) to MFAC and only terminate matching, when the flip-flop for the corresponding timing interval is set.

These flip-flops are controlled via MAC. Control points are located in MCG4 (FIG. 18). In this way it is possible to enable abnormal condition detection during some or all timing intervals.

Unlocking of Match Registers

All four Match registers are inhibited from accepting data when MAENFϕ 90 = ϕ. In addition:

MRϕ and MR1 are inhibited when MRUF = ϕ

MIRϕ and MIR1 are inhibited when MIRUF =ϕ

The Match Register Unlock FF's MRUF 108 and MIRUF 109 are located in MAN control logic. Their MAC control points are located in MCG4 (see FIG. 18).

Normal Status of MAN

When both CP's are up and matching the status of MAN is as follows (normal). Mode: continuous, flip-flops 110 MAENF1 = 1, SMENF =ϕAbnormal Condition: mismatch DMMF = 1 Timing Intervals: all intervals enabled TϕMSF, . . . , T7MSF = 1 Unlocking: all register unlocked MRUF = MIRUF = 1

All other conditions of MAN are used during recovery, routining or diagnosis.

Contents Of Match Registers After Interrupts

This section lists information in the match registers of both CP's immediately after an Interrupt Cycle (i.e., cycle during which ICCSL = 1). At this time, the information in these registers and in the MFAC Error Flip-flops provide the input data for the recovery programs.

We assume here that both CP's have generated ICCSL.

a. MRϕ of both machines always contains the instruction address that was in AOR duing TL6 of Interrupt Cycle. The relation between this address and failing address will be discussed below.

b. When interrupts are caused because of reasons other than abnormal match conditions, the other match registers contain irrelevant data.

c. When interrupts are caused because of abnormal match conditions that have been observed in both machines.

c1. If abnormal match occurred during even timing interval:

MIRϕ. X contains failing data of home CP

MR1 = MIR1.X contains data on IIB of home CP during interval following abnormal condition.

MR1.X =MIR1 contains data on IIB of external CP during interval following abnormal condition.

c2. If abnormal match occurred during odd timing interval:

MR1 = MIR1.X contains failing data of home CP.

MR1.X = MIR1 contains failing data of external CP.

MIRϕ contains data on IOB of external CP during interval following abnormal condition.

MIRϕ.X contains data on IOB of home CP during interval following abnormal condition.

d. When interrupts are caused because of abnormal match conditions that were observed only in one (say: home) CP, the data of only MRϕ, MR1, MIRϕ.X, and MIR1.X can be used.

MRϕ contents as in (a) above,

MR1, MIRϕ and MIR1.X as in (c1) or (c2) above

MAN Control Logic

The MAN Control Logic 83:

a. Provides the enabling signals for the match registers.

b. Processes the outputs of the match circuits to two error indicators MCϕDF 115 and MC1DF 116.

c. Produces SSBYL (Stop Standby CP Level) on occurrence of interrupt, during sample match cycle.

The principal flip-flops of MAN control logic have already been described in connection with FIG. 19.

Match Register Controls

Accept Levels

MRϕAL = MAENFϕ.MRUF.MCϕDF.(TϕAL v T2AL V T4AL v T6AL) v ICCSL T6AL

MIRϕAL = MAENFϕ.MIRUF.MCϕDF

MR1AL = MAENFϕ.MRUF.MC1DF.(T1AL vT3AL v T5AL v T7AL

MIR1AL = MAENFϕ.MIRUF.MC1DF MC1DF

Note 1 MRϕ accepts address from AOR during TL6 of Interrupt Cycle.

Other Controls For Match Registers a. All registers can be cleared by MAC (see FIG. 18 for allocation of reset control points)

b. Bits can be set to 1 by MAC

MCGϕ contains set control points for MRϕ
MCG1 contains set control points for MIRϕ
MCG2 contains set control points for MR1
MCG3 contains set control points for MIR1.

c. Match registers can be read out by MAC

MSGϕ contains sense points by MRϕ
MSG1 contains sense points of MIRϕ
MSG2 contains sense points of MR1
MSG3 contains sense points of MIR1.

Generation Of Outputs to MFAC

Outputs are:

MCϕDF, which becomes 1 when information loaded into the match registers during even intervals causes an abnormal match condition.

MC1DF, which becomes 1 when information loaded into the match registers during odd intervals causes an abnormal match condition.

Both MCϕDF and MC1DF are D-type flip-flops and will be set for the two timing intervals following the timing interval in which the match registers are loaded with information which causes an abnormal match condition.

Accept level for MCϕDF = T1AL v T3AL v T5AL v T7AL

Accept level for MC1DF = TϕAL v T2AL v T4AL v T7AL

Screened data input for MCϕDF = (MCϕOL ⊙ DMMF).MAENF1. (TϕMSF.TIPL v T2MSF.T3PL v T4MSF.T5PL v T6MSF.T7PL). The symbol 120 represents an EXCLUSIVE OR gate in the drawing. Note: MAENF1 insures that matching always starts by a comparison during TLϕ of a cycle. (The screened data reach MCϕDF during TL1).

Control of Match Modes

Match Enable FF's

MAENFϕ=1: enables Match Registers to accept comparison data (provided that MRUF = MIRUF = 1).

MAENF1 =1: allows MCϕOL and MC1OL to propagate.

MAENFϕ: goes to 1 during TL3 or TL6 of the cycle preceding the start of matching.

Set MAENFϕ= MAENFϕS (during TL3) v (CYC2F · DCAAF) (AEQ). SMENF.T6PL.

Set MAENF1 = MAENFϕ. TIAL (Actual matching starts with comparison during TLϕ

Note: Last term sets MAENFϕ to start sample matching. AEQ = equality between contents of IAR.B27-B31 and SMAR.Bϕϕ-Bϕ4.

The Sample Match Address Match Circuit SMAMC performs the match between IAR.B27-B31 and SMAR.Bϕϕ-Bϕ4.

Matching terminates by resetting MAENFϕ and MAENF1.

| | | | |
|---|---|---|---|
| Reset MAENFϕ | = | reset MAENF1 | |
| | = | MODER v | (a) |
| | | ICCSL v | (b) |
| | | MCϕDF · (TϕAL v T2AL v T4AL v T6AL) v | (c) |
| | | MC1DF · (T1AL v T3AL v T5AL v T7AL) v | (d) |
| | | SMENF · SMEXF · T1PL | |

a. Stops matching under proper control.

b. Stops matching because of interrupt.

c. Stops matching during interval after MCϕDF goes to 1 (i.e. two timing intervals after occurrence of abnormal condition).

d. Stops matching during interval after MC1DF goes to 1 (i.e. two timing intervals after occurrence of abnormal condition).

e. Stops matching at the end of sample-match cycle.

Flip-flops Associated With Sample Match Mode

SMENF =1: indicates sample match mode.

Set SMENF = SMENFS (for location of control points, see FIG. 18).

Reset SMENF = MODER v
ICCSL v
SMEXF.T4PL (SMENF resets during TL4 of the sample cycle).

SMEXF = 1: indicates that address equality AEQ occurred in sample match mode Set SMEXF = SMENF ⊙ (DCCAF · CYC2F).AEQ.T6PL

Reset SMEXF = SMENF.T2AL

SMEXF is needed to provide reset inputs to MAENF and SMENF also.

Generation of Stop Standby Level

The Standby CP has to be stopped:

a. during interrupt cycle, b. at the end of a sample match cycle. SSBYL = ICCSL.T3PL v SMEXF.T4PL.

Parity Network (PAN)

PAN 81 seen in FIG. 16 includes five parity circuits:

a. ISR Parity Circuit (ISRPC) 125

Checks parity on ISR.Bϕϕ-B32, see Instruction Store Register 62 of IOC24, FIG. 7;

ISR (in IOC) is the buffer register which receives the data or instruction words from IS*.

Output ISDPL is true when parity is correct (odd).

b. Instruction Store Address Parity Circuit (ISAPC) 126

Checks parity over the address in Instruction Address Register 127 — (FIG. 6) LAR.B15-B31 (which addresses IS*) and Bϕϕ of the addressed IS* word (received in ISR.Bϕϕ). Output ISAPL is true when parity is odd.

When an instruction word is addressed in IS*, bit Bϕϕ is interpreted as part of the T-field which is encoded by assembler to yield odd parity when combined with address PZ. In this case MFAC interprets ISAPL as an addressing check.

When a data word is addressed in IS*, bit Bϕϕ forms part of the data and has no significance for address parity. In this case ISAPL is ignored by MFAC.

c. Instruction Store T-field Parity Circuit 128 (ISTPC)

Checks parity over ISR.Bϕϕ and ISR.Bϕ1. Output ISTPL is true when parity is odd.

In IS instruction words, Bϕϕ and Bϕ1 form the T-field and assembler encodes Bϕ1 such that T-field yields odd parity. In these cases ISTPL is interpreted by MFAC as a check on the T-field.

When an IS data word is addressed, MFAC ignores ISTPL since Bφφ and Bφ1 form part of the data word and have no significant for parity.

d. PSR Parity Circuit 130

Checks parity on Process Store register 63 PSR.Bφφ-B32 (FIGS. 7 and 16). PSR is the buffer register in IOC which receives data drom the Process Store Complex PS*. Output PSDPL is true when parity is correct (odd).

The above four parity circuits check information received by CP and produce check levels for MFAC. The fifth parity circuit generates parity on information transmitted by CP to the stores.

e. DR Parity Circuit (DPRC) 132

Data to be sent to IS* or PS* are buffered in Data Register 131 DR.Bφφ-B31 (located in DPC of FIG. 6). DPRC generates parity level GDPL which is transmitted by IOC as the 33rd bit (B32) of the outgoing data word.

Normally, GDPL is true when DR has even parity (this generates odd parity). However, when CP executes WISD or WPSD instructions, ROC7L becomes true and GDPL is inverted to generate even parity.

All of the above parity check circuits are conventional logic circuits for checking parity of binary signals.

Malfunction Analysis Circuit MFAC

The MFAC 82, as seen in FIG. 2 has the following functions:

a. Samples error signals and check levels from MAN 80, PAN 81, DPC 23 and PCC 22 according to specific instruction conditions and timing intervals to determine occurrence of malfunctions.

b. Stores the occurrence of a malfunction by setting a corresponding Error Flip-Flop.

c. Determines most likely cause of malfunction and produces corresponding error level (CPEL, ISEL, PSEL, PUEL) which is sent to ICC for possible initiation of an interrupt.

d. Cross-couples error levels between CP's.

The MFAC consists of three main parts:

a. The Error Flip-Flops.

b. The Instruction-Extension Flip-Flops (needed for malfunction analysis).

c. The error-level generation circuits.

Error Flip-Flops in MFAC

MFAC contains four groups of error flip-flops:

CP Error FF's
IS Error FF's
PS Error FF's
PU Error FF's

Individual FF's are set upon detection of specific malfunctions. Their purpose is two-fold:

a. To generate the error level associated with the most likely cause of the malfunction. When one (or more) FF in a particular group becomes set, the corresponding error level (CPEL, ISEL, PSEL or PUEL) is produced and sent to the Interrupt Control Circuit, ICC.

b. To allow detailed malfunction analysis under program control. All Error FF's can be inspected via MAC. Their outputs appear in sense group MSG4. Once set, the error FF's can be reset only by program control. Control point No. 20 (ERFR) in MCG4 resets all MFAC Error FF's.

Central Processor Error Flip-Flops

Seven CP error flip-flops indicate malfunctions which are most likely caused by the Central Processor. An abnormal match condition in timing interval 0 is considered as an IS error (see ISMEF).

a. Timing Interval 1 Match Error Flip-Flop (T1MEF)

T1MEF sets on detection of a mismatch (match) between CP's during timing interval 1.

b. Timing Interval 2 Match Error Fip-Flop (T2MEF)

T2MEF sets on detection of a mismatch (match between CP's during timing interval 2.

c. Timing Interval 3 Match Error Flip-Flop (T3MEF)

T3MEF sets on detection of a mismatch (match) between CP's during timing interval 3.

d. Timing Interval 4 Match Error Flip-Flop (T4MEF)

T4MEF sets on detection of a mismatch (match) between CP's during timing interval 4.

e. Timing Interval 5 Match Error Flip-Flop (T5MEF)

T5MEF is set on detection of a mismatch (match) between CP's during interval 5 except during the cycle following a PU instruction. In that case, the error is considered to be caused by PU.

f. Timing Interval 6 Match Error Flip-Flop (T6MEF)

T6MEF sets on detection of a mismatch (match) between CP's during timing interval 6.

g. Timing Interval 7 Match Error Flip-Flop (T7MEF)

T7MEF is set on detection of mismatch (match) between CP's during interval 7 except during PS or PU instructions. In these cases, malfunctions are considered to be caused by PS* or PU*. For detailed "set" conditions in these FF's see below.

Instruction Store Error Flip-Flops

The seven IS error flip-flops indicate malfunction which are most likely caused by the Instruction Store a. Instruction Store Match Error Flip-Flop (ISMEF)

ISMEF sets on a mismatch (match) during timing interval φ. Data matched in timing interval φ is always data or an instruction returned from the IS.

b. Instruction Store Data All-Seems-Well Flip-Flop (ISDWF)

ISDWF sets when the IS, addressed by the CP for data, fails to return an all-seems-well signal.

c. Instruction Store Data Parity Flip-Flop (ISDPF)

ISDPF sets when data returned by IS on RIS, XEC, and XECN instructions has a parity error.

d. Instruction Store Address Match Flip-Flop (ISAMF)

ISAMF sets when the echo address returned from IS does not match the address sent out by the CP. The echo match is performed for WIS, WISD, WISN, and RISA instructions.

e. Instruction Store Instruction All-Seems-Well (ISIWF)

ISIWF sets when the IS, addressed by the CP for an instruction, fails to return an all-seems-well signal.

f. Instruction Store Instruction Parity Flip-Flop (ISIPF)

ISIPF sets when a fetched instruction has a parity error.

g. Instruction Store Address Parity Flip-Flop (ISAPF)

ISAPF sets when either the instruction received from the IS was not the instruction addressed or that T field of the instruction returned has a single bit error.

When the IS buses are configured in diagnostic mode (ISDBL is true), the error flip-flops associated with data returned from the IS (ISDWF, ISDPF, and ISAMF) will not cause an IS error level output.

The detailed "set" conditions for these flip-flops are listed below.

Process Store Error Flip-Flops

Four PS error flip-flops indicate malfunctions which are most likely caused by the Process Store:

a. Process Store Match Error Flip-Flop (PSMEF)

PSMEF indicates match errors during TL7 of any instruction involving PS*. These match errors are associated with data or address echo returned by the PS complex.

b. Process Store Data All-Seems-Well Flip-Flop (PSDWF)

PSDWF indicates that the PS, when addressed by the CP failed to return al all-seems-well signal.

c. Process Store Data Parity Flip-Flop (PSDPF)

PSDPF indicates that data received from PS on a RPS instruction has incorrect (even) parity.

d. Process Store Address Match Flip-Flop (PSAMF)

PSAMF indicates that the echo address returned from PS does not match the address sent out by CP. The echo match is performed on WPS, WPSD, WPSN, and IRSA instructions.

For details "set" conditions see below.

Peripheral Unit Error Flip-Flops

The five PU error flip-flops indicate malfunctions which are most likely caused by the Peripheral Unit a. Peripheral Unit Match Error 1 Flip-Flop (PUME1F)

PUME1F indicates match errors during TL7 of any PU* instruction. These match errors are associated with echo address returned from the PU complex during any PU instruction.

b. Peripheral Unit Match Error 2 Flip-Flop (PUME2F)

PUME2F indicates match errors during TL5 of instructions following any PU* instruction. These match errors are associated with PU data returned in the cycle following a PU instruction.

c. Peripheral Unit Address All-Seems-Well Flip-Flop (PUAWF)

PUAWF indicates that the PU when addressed by the CP, failed to return an all-seems-well signal with the echo address during any PU instruction.

d. Peripheral Unit Data All-Seems-Well Flip-Flop (PUDWF)

PUDWF indicates that the PU failed to return an all-seems-well signal with the return data in the cycle following any PU instruction.

e. Peripheral Unit Address Match Flip-Flop (PUAMF)

PUAMF indicates that the echo address returned from the PU does not match the address sent to the PU complex. The echo match is performed during all PU instructions.

Detailed "set" conditions for these flip-flops are given below

MMC Instruction-Extension FF's

Certain error inputs have to be sampled by MFAC during the cycle following PS and PU instructions. Since at that time ICR no longer contains the particular instruction, it must be remembered by the Instruction Extension FF's.

Note since these FF's remember instructions during previous cycles, they have to be reset under program control before starting up a standby CP. Control point TNEXFR (bit 22) of MCG4 resets these FF's.

The five Instruction Extension FF's are:

a. PU Flip-Flop Zero (PUFϕ)

Sets during TL7 of any PU instruction; resets during TL6 of following cycle.

b. PU Flip-Flop One (PUF1)

Sets during TL5 of first cycle following any PU instructions; resets during TL4 of second cycle.

c. PS Flip-Flop (PSF)

Sets during TL7 of any PS instruction; resets during TL6 of next cycle.

d. Read PS Flip-Flop (RPSF)

Sets during TL7 of the RPS instruction; resets during TL6 of next cycle.

e. PS Address Echo FF (PSAEF)

Sets during TL7 of WPS, WPSD, WPSN and RPSA instructions (these require PS address echo); resets during TL6 of next cycle.

Control equations for these FF's are given below.

Error Level Generation

In first instance, MFAC produces four internal error levels:

CPIEL associated with the CP Error FF's.

ISIEL associated with the IS Error FF's.

PSIEL associated with the PS Error FF's.

PUIEL associated with the PU Error FF's.

The Match Error Interrupt Enable Flip-flop (MEIEF) must be set if match error flip-flops are to cause IS, PS, or PU interrupts. MEIEF is set through control point 23 of MCG4 and is reset by control point 2 of MCG4. MEIEF allows the match network to be used in diagnostics without requiring the IS, PS, and PU interrupts to be disabled. When MEIEF is not set, ISMEF will not cause ISIEL, PSMEF will not cause PSIEL, and PUME1F and PUME2F will not cause PUIEL.

To generate the error levels for ICC, these internal error levels are merged with the corresponding external error levels from the other CP. For example:

$$CPEL = CPYEL \vee CPSPF\ (CPXEL.X)$$

. Similar expressions hold for ISEL, PSEL and PUEL. Note that cross-coupling is inhibited when the "Separate FF" is set (CPSPF = 1).

In addition, MFAC produces external error levels for the MMC in the other CP, which again can be inhibited by CPSPF.

$$CPXEL = CPIEL\ CPSPF$$

Similar expressions hold for ISXEL, PSXEL and PUXEL.

Since ICC samples CPEL, ISEL, PSEL and PUEL during timing level TL1, these signals must be stable during this timing level. This requires some special arrangements — see Section 8.3 for details.

When ICC initiates an interrupt in response to CPEL, ISEL, PSEL or PUEL, these interrupts occur:

For CPEL: During first cycle following instruction that caused error. Note: MRϕ contains failing instruction address + 1.

For ISEL: During second cycle after the cycle that made the access to IS*.

Note: MRϕ contains failing instruction address + 1 for instruction fetches: failing instruction = instruction containing an error.

For data fetches: failing instructions = instruction causing error.

For PSEL: During first cycle following instruction that caused error. Note: MRϕ contains failing instruction address + 1.

For PUEL:

a. When caused by PUME1F, PUAWF or PUAMF, during first cycle following PU instruction that caused error.

Note: MRϕ contains failing instruction address + 1.

b. When caused by PUME2F or PUDWF, during second cycle following PU instruction.

Note: MRϕ contains failing instruction address + 2.

MMC Inputs Inputs from CCC a. CPSPF (Central Processor Separate Flip-Flop)

CPSPF Inhibits error signals from external CP and inhibits error signals to external CP.

b. ISDBL (IS Data Bus Level)

ISDBL indicates that the IS buses are in a diagnostic configuration (ISDBL = ISDBF.ISTBF). When ISDBL is true, IS data errors do not generate the interrupt signal (ISEL) to the ICC.

Inputs From DPC a. CMPLL (Comparator Left Level)

CMPLL indicates a match between the address sent and the echo address returned from the PS, IS, or PU complex.

b. DR (Data Register)

The DR (32 bits) holds data for transmission to the IS, PS, and PU complexes. The PAN generates the parity bit GDPL for IS and PS data held in the DR.

c. IAR (Instruction Address Register)

The IAR (17 bits) is used to address the instruction store. The PAN computes the parity of the IAR and checks it with the address parity bit returned from the IS on all instruction fetches. When sample matching is enabled the low order five bits of IAR are used to determine the instruction(s) to be matched.

d. IIB (Internal Input Bus)

The IIB (32 bits) buffered by MR1, is the internal CP data source for match system 1.

e. IOB (Internal Output Bus)

The IOB (32 bits), buffered by MRϕ, is the internal CP data source for match system ϕ.

Input From ICC

ICCSL (Interrupt Control Circuit Sequence Level)

ICCSL indicates the execution of a maintenance interrupt. It is used by MAN to stop matching, lock the match circuit input registers (MRϕ, MR1, MIRϕ, and MIR1), to place the failing instruction address in MRϕ during timing interval 6, and to generate the stop standby CP level.

Inputs From IOC a. ISR (Instruction Store Register)

The ISR (34 bits) buffer data returned from the instruction store. The PAN checks the parity of the data (ISR.Bϕϕ-ISR.B31) with the parity bit ISR.B32. The test field (ISR.Bϕϕand ISR.Bϕ1) is also checked against the parity of the IAR for instruction fetches. ISR.B33 indicates an IS operation all-seems-well and is checked by the MFAC.

b. PSR (Process Store Register)

The PSR (34 bits) buffers data returned from the PRocess Store. The PAN checks the parity of the data (PSR.Bϕϕ-PSR.B31) against the parity bit PSR.B32. PSR.B33 indicates a PS operation all-seems-well and is checked by the MFAC.

c. PUR.B32 (Peripheral Unit Register Bit 32)

PUR.B32 indicates a PU operation all-seems-well and is checked by the MFAC.

Inputs From MAC a. IMSB (Internal Maintenance Selection Bus)

IMSB.B26 through IMSB.B31 are used by MAC to select maintenance sense point groups and control point groups within MMC.

b. IMDB (Internal Maintenance Data Bus)

IMDB (32 bits) is used by MAC to write the maintenance control points in the group selected by IMSB.

Inputs From The MMC Of The Other (External) CP a. CPXEL.X (Central Processor External Error Level)

CPXEL.X indicates a CP malfunction detected in the external Central Processor.

b. ISXEL.X (Instruction Store External Error Level)

ISXEL.X indicates an IS malfunction detected in the external Central Processor.

c. MRϕ.X (Match Register ϕ In External CO (Copy)

The MRϕ.X (32 bits), which buffers data from IOB.x, is the external CP data source for match circuit ϕ. MRϕ.X is buffered by MIRϕ.

d. MR1.X (Match Register 1 In External CP Copy)

The MR1.X (32 bits), which buffers data from IIB.X, is the external data source for match circuit 1. MR1.X is buffered MIR1.

e. PSXEL.X (Process Store External Error Level)

PSXEL.X indicates a PS malfunction detected in the external Central Processor.

f. PUXEL.X (Peripheral Unit External Error Level)

PUXEL.X indicates a PU malfunction detected in the external Central Processor.

Inputs From PCC a. DCCAF (Dual Cycle Control A Flip-Flop)

DCCAF is true when a multi-cycle instruction is executed. DCCAF is set by 2*L of the first cycle and reset by T1*L of the last cycle. DCCAF is used in selecting the cycle to sample match.

b. DCCBF (Dual Cycle Control B Flip-Flop)

DCCBF is set by T7*L in the first cycle of an IS instruction and is reset by T6*L in the second (last) cycle.

c. ICR.Bϕ5 (Instruction Content Register Bit 5)

ICR.Bϕ5 designates WXX, WXXD, WXXN, or RXXA instructions where XX is IS, PS, or PU.

d. ICR.Bϕ7 (Instruction Content Register Bit 7)

ICR.Bϕ5 ICR.Bϕ7 is used in determining RPS, RIS, XEC and XECN instructions.

e. MCF (Multi-Cycle Flip-Flop)

MCF is set by T7*L in the first cycle of XEB, XECN, and IS instructions. MCF is reset by T6*L of the last cycle of the instructions.

f. ROCL7 (Relative Op Code Level 7)

ROCL7 indicates that an IS or PS instruction is a WISD or WPSD instruction. The PAN generates inverted data parity for these instructions.

g. RTCL4 (Relative Type Code Level 4)

RTCL4 indicates the PCC decode of a PS instruction.

h. RTCL5 (Relative Type Code Level 5)

RTCL5 indicates the PCC decode of a PS instruction.

i. RTCL6 (Relative Type Code Level 6)

RTCL6 indicates the PCC decode of a PU instruction.

Inputs From TGC

TϕAL, . . . , T7AL (Timing Interval Accept Levels)
TϕPL, . . . , T7PL (Timing Interval Place Levels)

Timing interval accept and place levels are used to synchronize matching with CP operations and to provide the time reference for sampling error signals. Tn*L denotes TnAL or TnPL where the choice is left to the designer.

MMC Outputs
Match Network Outputs

| DESTINATION | NAME | DESCRIPTION |
|---|---|---|
| TGC | SSBYL | Stop Standby CP Level This signal will inhibit timing levels in the standby CP (levels generated by the standby and levels coming from the other active CP). The signal will be generated after a sample match or ICCSL is received. |
| MMC.X | MRϕ | Match Register Zero MRϕ is used by the external MAN for matching with the external MRϕ. |
| MMC.X | MR1 | Match Register One MR1 is used by the external MAN for matching with the external MR1. |
| MAC | IMRB | Internal Maintenance Return Bus MAC uses IMSB to access the match mode flip-flops and return their values on the IMRB. The four match systems input registers are accessed in the same manner. |
| Outputs to Other Circuits Within MMC: | | |
| MFAC | MCϕDF | Match Circuit Zero Detection Flip-Flop MCϕDF indicates that the abnormal match condition specified by the match mode was detected by MAN while matching in an odd timing interval. |
| MFAC | MC1DF | Match Circuit One Detection Flip-Flop MC1DF indicates that the abnormal match condition specified by the match mode was detected by MAN while matching in an even timing interval |

Outputs From Parity Network (PAN) Outputs

| DESTINATION | NAME | DESCRIPTION |
|---|---|---|
| IOC | GDPL | Generated Data Parity Level The IOC transmits GDPL as the parity bit or 33rd of outgoing data to the IS and PS complexes. |
| Outputs of PAN to Circuits Within MMC: | | |
| MFAC | ISAPL | Instruction Store Address Parity Level ISAPL indicates that the IAR and ISR.Bϕϕ has odd parity (correct instruction address parity). |
| MFAC | ISDPL | Instruction Store Data Parity Level ISDPL indicates that the ISR has odd parity (correct IS data parity). |
| MFAC | ISTPL | Instruction Store Test Parity Level ISTPL indicates that the ISR test field has odd parity (correct instruction test parity). |
| MFAC | PSDPL | Process Store Data Parity Level PSDPL indicates that the PSR has odd parity (correct PS data parity). |

Malfunction Analysis Circuit (MFAC) Outputs

-continued

MMC Outputs
Match Network Outputs

| DESTINATION | NAME | DESCRIPTION |
|---|---|---|
| ICC | CPEL | Central Processor Error Level CPEL indicates to the ICC the detection of a CP malfunction. |
| ICC | ISEL | Instruction Store Error Level ISEL indicates to the ICC the detection of an IS malfunction. |
| ICC | PSEL | Process Store Error Level PSEL indicates to the ICC the detection of a PS malfunction. |
| ICC | PUEL | Peripheral Unit Error Level PUEL indicates to the ICC the detection of a PU malfunction. |
| MMC.X | CPXEL | Central Processor External Error CPXEL indicates to the external MMC the detection of a CP malfunction. |
| MMC.X | ISXEL | Instruction Store External Error Level ISXEL indicates to the external MMC the detection of a IS malfunction. |
| MMC.X | PSXEL | Process Store External Error Level PSXEL indicates to the external MMC the detection of a PS malfunction. |
| MMC.X | PUXEL | Peripheral Unit External Error Level PUXEL indicates to the external MMC the detection of a PU malfunction. |
| IMRB | See F.5 | Internal Maintenance Return Bus IMRB returns the value of error flip-flops in the MFAC when accessed by MAC. |
| PCC | INEXFRL | Instruction-Extension FF Reset INEXFR is MAC control point 22 of MCG4 which resets PUFϕ, PSF, PSAEF, and RPSF of MFAC as well as DCCAF, DCCBF, MCF, and RPUF in the PCC. |

Design Equations For MFAC

This section lists control equations for Instruction Extension FF's Error FF's, and Error Levels in terms of inputs to MMC and internally developed quantities.

Control of Instruction Extension FF's

| | |
|---|---|
| Set PUFϕ | = T7*L·RTCL6 |
| Set PUF1 | = T5*L·PUFϕ |
| Set PSF | = T7*L·RTCL5 |
| Set PSAEF | = T7*L·RTCL5·ICR·Bϕ5 |
| Set RPSF | = T7*L·RTCL5·ICR·Bϕ5·ICR·Bϕ7 |
| Reset PUFϕ | = reset·PSF = reset PSAEF = reset RPSF = T6*L v INEXFR |
| Reset PUF1 | = T4*1. |

Note: INEXFR (point 22 of MCG4) is addressed by WMCG or WMCP instruction.

Control of Error Flip-Flops

All error FF's are reset by ERFR (point 20 of MCG4) when addressed by a WMCG or WMPG instruction.

CP Error FF's

Set T1MEF = T3AL.MC1DF
Set T2MEF = T4AL.MCφDF
Set T3MEF = T5AL.MC1DF
Set T4MEF = T6AL.MCφDF
Set T5MEF = T7AL.MC1DF.PUF1
Set T6MEF = TφAL.FCφDF
Set T6MEF = TφAL.MCφDF
Set T7MEF = T1AL.MC1DF.PUFφ.PSF

Note: Setting of the above FF's occurs two timing intervals after occurrence of abnormal match condition.

IS Error FF's

Set ISMEF = T2AL MCφDF
Set ISDWF = T2AL ISR.B33 MCF
Set ISDPF = T2AL ISDPL MCF ((ICR.Bφ5 ICR.Bφ7) v DCCBF)
Set ISAMF = T2AL CMPLL DCCBF ICR.Bφ5 v AMFS
Set ISIWF = T2AL ISR.B33 MCF
Set ISIPF = T2AF ISDPL MCF
Set ISAPF = T2AL (ISAPL v ISTPL) MCF

PS Error FF's

Set PSMEF = T1AL MC1DF PSF
Set PSDWF = T7AL PSR.B33 RTCL5
Set PSDPF = TφAL PSDPL RPSF
Set PSAMF = TφAL CMPLL PSAEF v AMFS

PU Error FF's

Set PUME1F = T1AL MC1DF PUFφ
Set PUME2F = T7AL MC1DF PUF1
Set PUAWF = T7AL PUR.B32 RTCL6
Set PUDWF = T5AL PUR.B32 PUFφ
Set PUAMF = TφAL CMPLL PUFφ v AMFS

Note: AMFS = MAC control point 21.

Error Level Generation

Match Error Interrupt Enable Flip-Flop

MEIEF allows IS, PS, and PU match error flip-flop to cause IS, PS, and PU interrupts.

Set MEIEF = Control point 23 of MCG4.
Reset MEIEF = Control point 2 of MCG4.

Internal Error Levels

Note 1: Since ICC samples error levels in TL1, these levels, and also the internal error levels (from which they are derived) are not allowed to change during this interval. Note that Error Flip-Flops T7MEF, PSMEF and PUME1F are set during TL1. Therefore we use:

| | |
|---|---|
| MC1DF PUFφ PSF | instead of T7MEF |
| MC1DF PSF | instead of PSMEF |
| MC1DF PUFφ | instead of PUME1F |

These levels are stable during TL1.

In all other cases the outputs of Error FF's are used for generation of internal error levels.

Note 2: When CP* - IS* is in the diagnostic configuration (ISDBL = 1) the ISEL should not respond to Error Flip-Flops ISDWF, ISDPF and ISAMF.

CPIEL = T1MEF v T2MEF v T3MEF v T4MEF v T5MEF v T6MEF v MC1DF PUFφ PSF

ISIEL = ISMEF.MEIEF v ISDBL (ISDWF v ISDPF v ISAMF) v ISIWF v ISIPF v ISAPF

PSIEL = MC1DF.PSF.MEIEF v PSDWF v PSDPF v PSAMF

PUIEL = MC1DF.PUFφ.MEIEF v PUME2F MEIEF v PUAWF PUDWF v PUAMF

External Error Levels (to MMC in external CP)

CPXEL = CPSPF.CPIEL
ISXEL = CPSPF.ISIEL
PSXEL = CPSPF.PSIEL
PUXEL = CPSPF.PUIEL

Error Levels (to ICC in home CP)

CPEL = CPIEL v CPSPF.CPXEL.X
ISEL = ISIEL v CPSPF.ISXEL.X
PSEL = PSIEL v CPSPF.PSXEL.X
PUEL = PUIEL v CPSPF.PUXEL.X

We claim:

1. In a data processing system having first and second central data processors each operating synchronously and including processing circuits and maintenance circuits, said system being adapted wherein only one of said processors is active at one time and the other is standby, and further including first and second storage means, each provided with its own bus and adapted for selective communication with said data processors, said data processors each including a storage register for said storage means, the improvement comprising:

timing generator circuit means for generating at least two separate sequential mutually exclusive timing level signals; malfunction monitor circuit means in each of said central processors for detecting and isolating malfunctions in said system and including:

match network circuit means receiving first sets of data signals responsive to said mutually exclusive timing level signals from the data processing circuits of its own central processor and receiving second sets of data signals responsive to said mutually exclusive timing level signals from the data processing circuits of the other central processor for comparing said first and second sets of data signals and generating mismatch error level signals when said first and second sets of data signals do not match;

first malfunction analysis circuit means responsive to said mismatch error signals, and said mutually exclusive, timing level signals for generating output signals representative of a suspected circuit of said system causing the mismatch; and parity network circuit means receiving signals transmitted to and received from said external storage means for checking the parity thereof and for generating parity error signals in response to a detected parity error; and wherein said malfunction analysis circuit is further responsive to said parity error signals.

2. The system of claim 1 wherein said processing circuits of each central data processor include data processing circuit means and processor control circuit means and said timing generator circuit means generates a predetermined number of said mutually exclusive timing level signals in sequential order comprising a machine cycle time, further including:

second malfunction analysis circuit means which would permit response to program instruction signals and to said timing level signals for detecting the occurrence of malfunctions in said matched network circuit means, said parity network circuit means, said data processing circuit means, and said processor control circuit means as a function of the timing level signals;

said second malfunction analysis circuit means further comprises a corresponding error flip-flop for the storage of each malfunction detected;

and means for cross coupling error level signals between central processors.

3. The apparatus of claim 2 wherein said second malfunction monitor circuit means further comprises:

first circuit means for actuating said malfunction monitor circuit under no match conditions;

second circuit means for actuating said malfunction monitor circuit under continuous match conditions; and third circuit means for actuating said malfunction monitor circuit under sampled match conditions.

4. The system of claim 1 wherein said central processor includes an internal output bus in said data processing circuits which would permit transmitting data signals under program instruction signal control and an internal input bus in said data processing circuits which would permit receiving data signals under program instruction signal control; and wherein said match network circuit means in each central processor further comprises:

first and second match register means which would permit receiving and storing data signals under program instruction signal control respectively from said internal output bus and from said internal input bus in its associated central processor in response to program control signals;

first and second match image register means associated respectively with said first and second match registers and which would permit receiving and storing data under program instruction signal control respectively from the internal output bus of the other central processor and from the internal input bus of the other central processor; and first and second match circuit means responsive respectively to the output signals of said first match register and said first match image register, and said second match register and said second match image register for generating error signals upon the detection of a mismatch between the respective sets of input signals.

5. The system of claim 4 further comprising:

means for inter-central processor communication including first bus means for coupling the match error signals of one malfunction analysis circuit means to the error level generator circuitry of the other central processor;

second bus means for coupling the output data of each match register to the match image register of the other match network circuit; and third bus means for coupling the output data of each of said second match registers to the input of the match image register in the other central processor.

6. The system of claim 4 further comprising:

circuit means which would permit clearing the match registers of each malfunction monitor circuit under program instruction signal control.

7. The system of claim 4 wherein each data processor circuit means includes a plurality of general registers further comprising:

means which would permit writing the contents, under program instruction signal control, of the general registers of each central processor into its associated match circuits, in response to the maintenance access circuit of the active central processor.

* * * * *